(12) United States Patent
Kojima et al.

(10) Patent No.: US 11,532,436 B2
(45) Date of Patent: Dec. 20, 2022

(54) MULTILAYER CERAMIC ELECTRONIC COMPONENT INCLUDING OUTER ELECTRODES CONNECTED TO METAL TERMINALS

(71) Applicant: Murata Manufacturing Co., Ltd., Nagaokakyo (JP)

(72) Inventors: Takahiro Kojima, Nagaokakyo (JP); Masakazu Itamochi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 147 days.

(21) Appl. No.: 16/439,815

(22) Filed: Jun. 13, 2019

(65) Prior Publication Data
US 2020/0006004 A1    Jan. 2, 2020

(30) Foreign Application Priority Data

Jun. 27, 2018   (JP) .............................. JP2018-122471

(51) Int. Cl.
*H01G 4/30*     (2006.01)
*H01G 4/232*    (2006.01)
(Continued)

(52) U.S. Cl.
CPC ................. *H01G 4/30* (2013.01); *H01G 4/12* (2013.01); *H01G 4/228* (2013.01); *H01G 4/232* (2013.01)

(58) Field of Classification Search
CPC ............ H01G 4/224; H01G 4/30; H01G 4/12; H01G 4/228; H01G 4/2325; H01G 4/232; H01G 2/065
See application file for complete search history.

(56) References Cited

U.S. PATENT DOCUMENTS 6,288,887 B1    9/2001   Yoshida et al.
10,056,193 B1 *  8/2018   Son .................. H01G 4/232
(Continued)

FOREIGN PATENT DOCUMENTS

CN    1707709 A     12/2005
JP    59-103397 A    6/1984
(Continued)

OTHER PUBLICATIONS

Official Communication issued in corresponding Japanese Patent Application No. 2018-122471, dated Oct. 13, 2020.
(Continued)

*Primary Examiner* — David M Sinclair
(74) *Attorney, Agent, or Firm* — Keating & Bennett, LLP

(57) ABSTRACT

A multilayer ceramic electronic component includes an electronic component main body including a first outer electrode disposed on a first side surface of a multilayer body, and a second outer electrode spaced apart from the first outer electrode and disposed on the first side surface, a first metal terminal connected to the first outer electrode, a second metal terminal connected to the second outer electrode, and an exterior material. The first side surface or a second side surface opposes a mounting surface of a mounting substrate, first and second inner electrode layers are disposed perpendicularly or substantially perpendicularly to the mounting surface, and a portion of the first side surface, the first and second outer electrodes, and a portion of the first and second metal terminals are covered with the exterior material.

10 Claims, 12 Drawing Sheets

(51) Int. Cl.
*H01G 4/12* (2006.01)
*H01G 4/228* (2006.01)

(56) References Cited

U.S. PATENT DOCUMENTS

| | | | |
|---|---|---|---|
| 10,468,195 B1* | 11/2019 | Kim | H05K 1/181 |
| 2009/0147440 A1* | 6/2009 | Cygan | H01G 4/232 |
| | | | 361/306.3 |
| 2009/0296311 A1* | 12/2009 | Otsuka | H01G 4/2325 |
| | | | 361/306.3 |
| 2010/0238604 A1 | 9/2010 | Oh | |
| 2011/0102969 A1* | 5/2011 | Togashi | H01G 4/30 |
| | | | 361/306.3 |
| 2011/0157769 A1* | 6/2011 | Kang | H01G 4/30 |
| | | | 361/321.4 |
| 2011/0285498 A1* | 11/2011 | Yoneda | H01C 1/144 |
| | | | 338/306 |
| 2011/0290542 A1* | 12/2011 | Nishisaka | H01C 7/008 |
| | | | 174/257 |
| 2013/0050896 A1* | 2/2013 | Park | H01G 4/30 |
| | | | 361/321.1 |
| 2013/0120899 A1 | 5/2013 | Chung et al. | |
| 2013/0120900 A1 | 5/2013 | Chung et al. | |
| 2014/0118882 A1* | 5/2014 | Masuda | H01G 4/2325 |
| | | | 361/321.2 |
| 2015/0187502 A1 | 7/2015 | Hwang | |
| 2016/0118190 A1* | 4/2016 | Park | H01G 2/06 |
| | | | 174/260 |
| 2016/0219739 A1* | 7/2016 | Park | H01G 4/228 |
| 2016/0307700 A1* | 10/2016 | Park | H05K 3/301 |
| 2016/0343506 A1* | 11/2016 | Lee | H01G 4/248 |
| 2017/0186539 A1* | 6/2017 | Masuda | H01G 4/248 |
| 2018/0211784 A1* | 7/2018 | Ando | H01G 4/248 |
| 2018/0294100 A1* | 10/2018 | Ando | H01G 4/232 |
| 2019/0115156 A1* | 4/2019 | Konrad | H01G 2/065 |

FOREIGN PATENT DOCUMENTS

| | | | | |
|---|---|---|---|---|
| JP | S6011466 U | * | 1/1985 | |
| JP | 03-220708 A | | 9/1991 | |
| JP | 04059124 U | * | 5/1992 | |
| JP | 09266125 A | * | 10/1997 | |
| JP | 2000-235932 A | | 8/2000 | |
| JP | 2004273935 A | * | 9/2004 | H01G 4/252 |
| JP | 2005-317607 A | | 11/2005 | |
| JP | 2005317607 A | * | 11/2005 | |
| JP | 2006-093532 A | | 4/2006 | |
| JP | 2007-158046 A | | 6/2007 | |
| JP | 2008-172050 A | | 7/2008 | |
| JP | 2008-277505 A | | 11/2008 | |
| JP | 2010161172 A | * | 7/2010 | H01G 4/30 |
| JP | 2011-040684 A | | 2/2011 | |
| JP | 2011040683 A | * | 2/2011 | H01G 4/252 |
| JP | 2017-120931 A | | 7/2017 | |
| KR | 10-2010-0104894 A | | 9/2010 | |
| KR | 20100066080 A | * | 3/2011 | |
| KR | 10-2013-0053878 A | | 5/2013 | |
| KR | 10-2015-0078663 A | | 7/2015 | |
| KR | 20170028610 A | * | 3/2017 | |
| KR | 20170031916 A | * | 3/2017 | |

OTHER PUBLICATIONS

Official Communication issued in Korean Patent Application No. 10-2019-0069756, dated Jul. 8, 2020.

Official Communication issued in corresponding Chinese Patent Application No. 201910565888.6, dated Dec. 24, 2020.

* cited by examiner

IV-IV CROSS-SECTIONAL VIEW

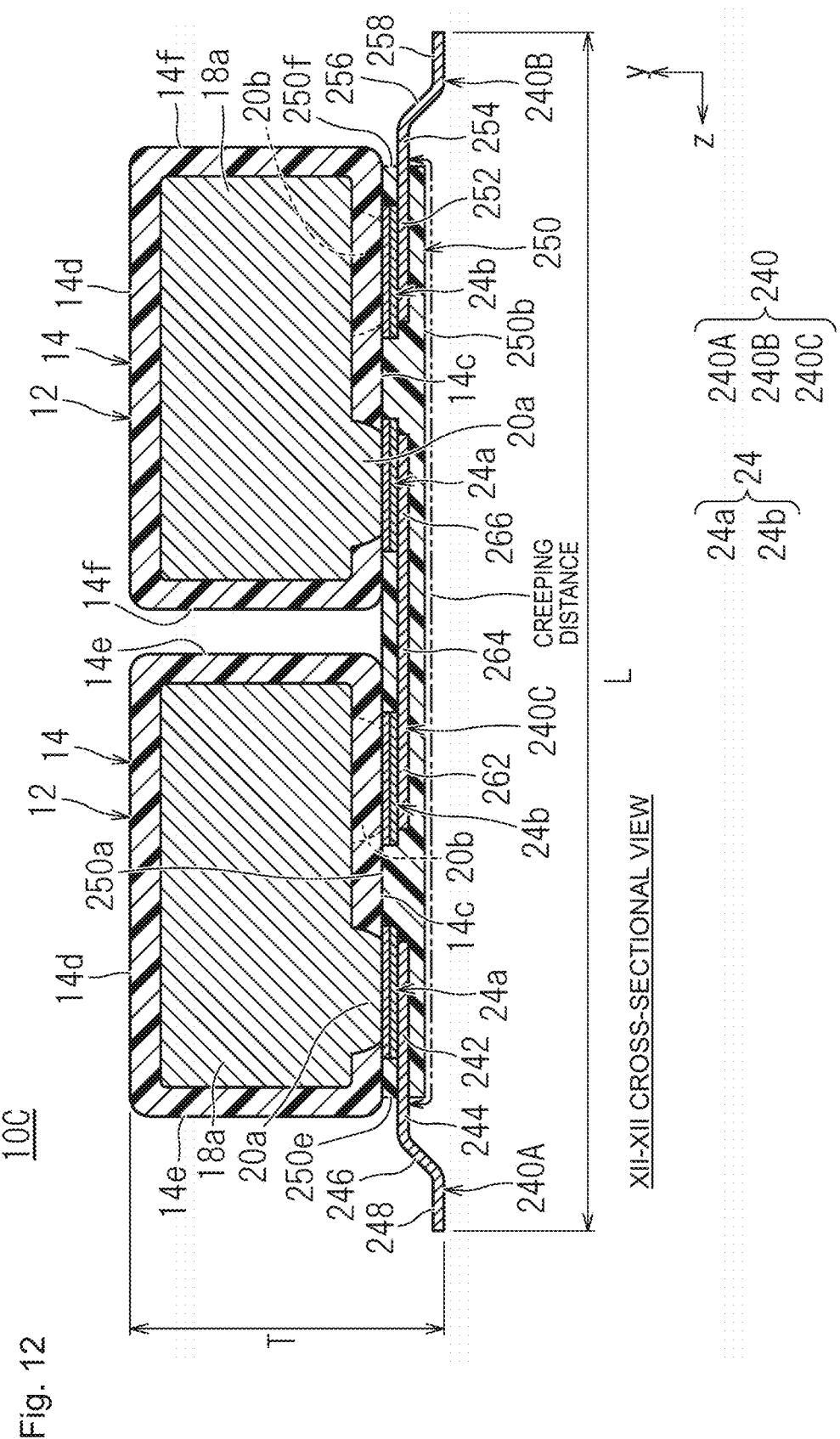

MULTILAYER CERAMIC ELECTRONIC COMPONENT INCLUDING OUTER ELECTRODES CONNECTED TO METAL TERMINALS

CROSS REFERENCE TO RELATED APPLICATIONS

This application claims the benefit of priority to Japanese Patent Application No. 2018-122471 filed on Jun. 27, 2018. The entire contents of this application are hereby incorporated herein by reference.

BACKGROUND OF THE INVENTION

1. Field of the Invention

The present invention relates to a multilayer ceramic electronic component including a multilayer ceramic capacitor, for example.

2. Description of the Related Art

An inverter circuit that is suitable for energy saving and also suitable for achieving high efficiency has been adopted in consideration of environments. However, recently, there is a tendency that working voltages become higher, and therefore, there is a tendency that an inverter circuit capable of supporting a higher voltage and a larger current is required.

In a case in which an electronic component, such as a multilayer ceramic capacitor, is used at a high voltage, a discharge between outer electrodes (creeping discharge) is likely to occur. Therefore, in a high voltage inverter circuit, a creeping distance of discharge is defined according to official standards.

From such a requirement, in a high voltage inverter circuit, for example, film capacitors capable of easily securing the creeping distance of discharge that are disclosed in Japanese Unexamined Patent Application Publication No. 2008-172050 and Japanese Unexamined Patent Application Publication No. 2008-277505, a capacitor with a metal terminal disclosed in Japanese Unexamined Patent Application Publication No. 2000-235932, and the like are increasingly used for the capacitors.

However, although each film capacitor disclosed in Japanese Unexamined Patent Application Publication No. 2008-172050 and Japanese Unexamined Patent Application Publication No. 2008-277505 is able to secure the creeping distance of discharge, there have been the following problems: a problem in that the capacitor cannot be structurally miniaturized, a problem in that, since a lead terminal needs to be provided due to its structure, the capacitor is able to be mounted only by using an insertion-mounting technique in which the lead terminal is inserted in a through-hole of the mounting substrate, and the like. Accordingly, in recent years, it has been difficult to meet demands from the market for miniaturization, surface mounting, and the like of electronic components.

Further, the capacitor with a metal terminal disclosed in Japanese Unexamined Patent Application Publication No. 2000-235932 has a problem in that a creeping distance of discharge cannot be satisfactorily secured, a problem in that, due to the presence of the metal terminal, equivalent series resistance (ESR)/thermal resistance is increased so that the amount of heat generation in the multilayer ceramic capacitor increases, and other problems.

SUMMARY OF THE INVENTION

Accordingly, preferred embodiments of the present invention provide multilayer ceramic electronic components that are each able to be miniaturized and surface-mounted while reducing or preventing creeping discharge and heat generation, and that are each capable of improving a density of electrostatic capacitance while preventing the creeping discharge by securing the creeping distance of discharge.

A multilayer ceramic electronic component according to a preferred embodiment of the present invention includes an electronic component main body including a multilayer body including a plurality of dielectric layers that are laminated and a plurality of inner electrode layers that are laminated, and including a first principal surface and a second principal surface opposing each other in a lamination direction, a first side surface and a second side surface opposing each other in a width direction orthogonal or substantially orthogonal to the lamination direction, and a first end surface and a second end surface opposing each other in a lengthwise direction orthogonal or substantially orthogonal to both the lamination direction and the width direction; a first outer electrode disposed at least on the first side surface and a second outer electrode spaced away from the first outer electrode and disposed at least on the first side surface; and a first metal terminal connected to the first outer electrode and a second metal terminal connected to the second outer electrode, wherein the inner electrode layers include a first inner electrode layer and a second inner electrode layer; the first inner electrode layer includes a first opposing section opposing the second inner electrode layer, and a first extended section extending to at least a portion of the first side surface; the second inner electrode layer includes a second opposing section opposing the first inner electrode layer, and a second extended section that does not overlap with the first extended section of the first inner electrode layer and that extends to at least a portion of the first side surface; the electronic component main body is disposed such that the first side surface or the second side surface opposes a mounting surface of a mounting substrate on which the multilayer ceramic electronic component is to be mounted, and the first inner electrode layer and the second inner electrode layer are perpendicular or substantially perpendicular to the mounting surface; and a portion of the first side surface, the first outer electrode and the second outer electrode, and a portion of the first metal terminal and a portion of the second metal terminal are covered with an exterior material.

A multilayer ceramic electronic component according to a preferred embodiment of the present invention includes two or more of electronic component main bodies each including a multilayer body including a plurality of dielectric layers that are laminated and a plurality of inner electrode layers that are laminated, and including a first principal surface and a second principal surface opposing each other in a lamination direction, a first side surface and a second side surface opposing each other in a width direction orthogonal or substantially orthogonal to the lamination direction, and a first end surface and a second end surface opposing each other in a lengthwise direction orthogonal or substantially orthogonal to both the lamination direction and the width direction; a first outer electrode disposed at least on the first side surface of the multilayer body and a second outer electrode spaced apart from the first outer electrode and disposed at least on the first side surface; a first metal terminal connected to the first outer electrode of one of the electronic component main bodies; a second metal terminal connected to the second outer electrode of another one of the electronic component main bodies; and a third metal terminal extending to and connected to the second outer electrode of the one of the electronic component main bodies and the first outer electrode of the another one of the electronic component main bodies, wherein the two or more of the electronic component main bodies are disposed such that the first end surfaces, the second end surfaces, or the first end surface and the second end surface of the respective electronic component main bodies oppose each other while being spaced apart from each other; the inner electrode layers of each of the two or more of the electronic component main bodies include a first inner electrode layer and a second inner electrode layer; the first inner electrode layer includes a first opposing section opposing the second inner electrode layer, and a first extended section extending to at least a portion of the first side surface; the second inner electrode layer includes a second opposing section opposing the first inner electrode layer, and a second extended section that does not overlap with the first extended section of the first inner electrode layer and that extends to at least a portion of the first side surface; each of the two or more of the electronic component main bodies is disposed such that the first side surface or the second side surface opposes a mounting surface of a mounting substrate on which the multilayer ceramic electronic component is to be mounted, and the first inner electrode layer and the second inner electrode layer of each of the two or more of the electronic component main bodies are perpendicular or substantially perpendicular to the mounting surface; and a portion of the first side surface of each of the two or more of the electronic component main bodies, the first outer electrode and the second outer electrode of each of the two or more of the electronic component main bodies, and a portion of the first metal terminal, part of the second metal terminal and the third metal terminal are covered with an exterior material.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12 is a cross-sectional view taken along a line XII-XII in FIG. 11.

DETAILED DESCRIPTION OF THE PREFERRED EMBODIMENTS

1. Multilayer Ceramic Electronic Component

First Preferred Embodiment

Figure 1:
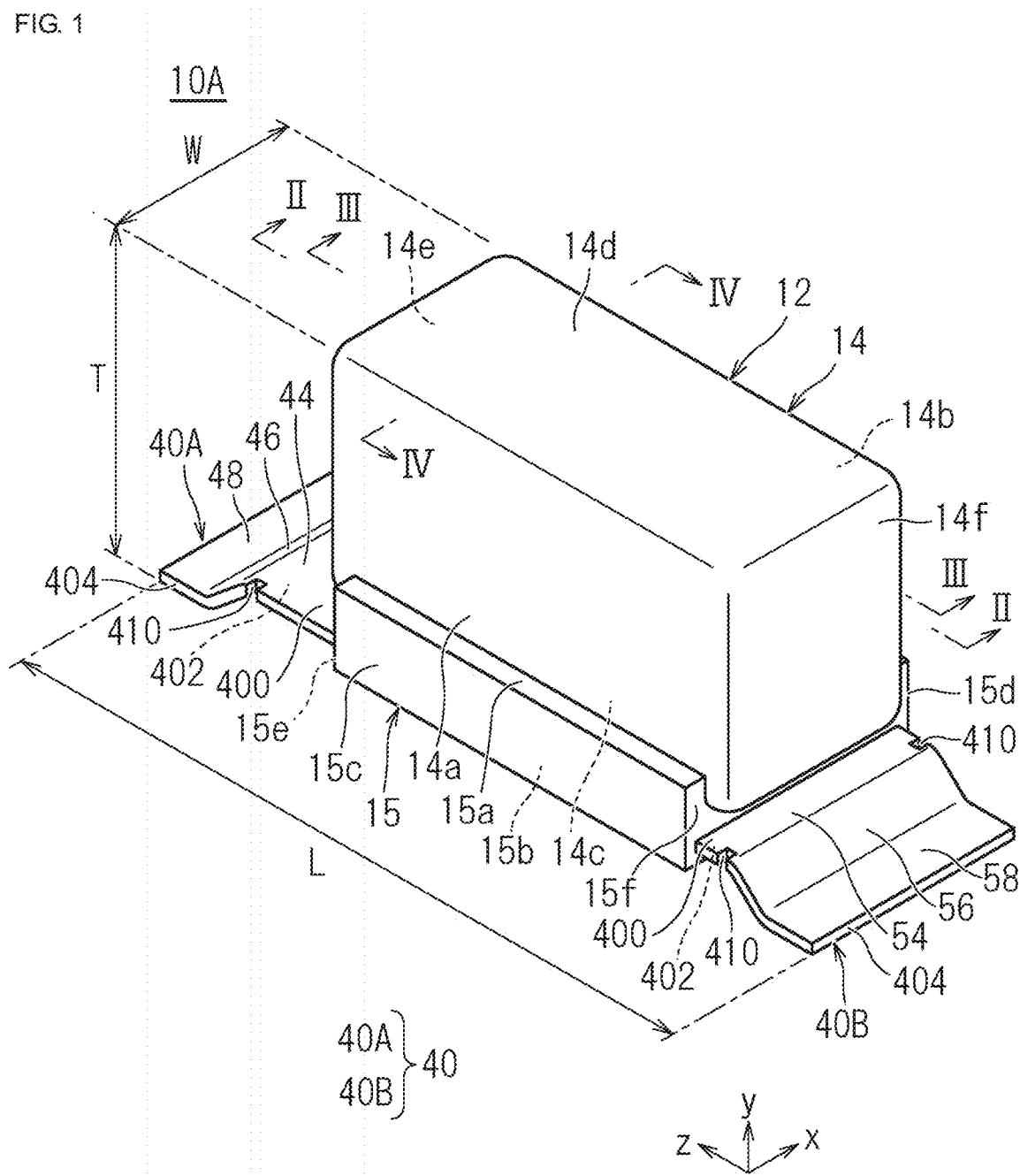
FIG. 1 is an external perspective view illustrating an example of a multilayer ceramic electronic component according to a first preferred embodiment of the present invention.
Figure 2:
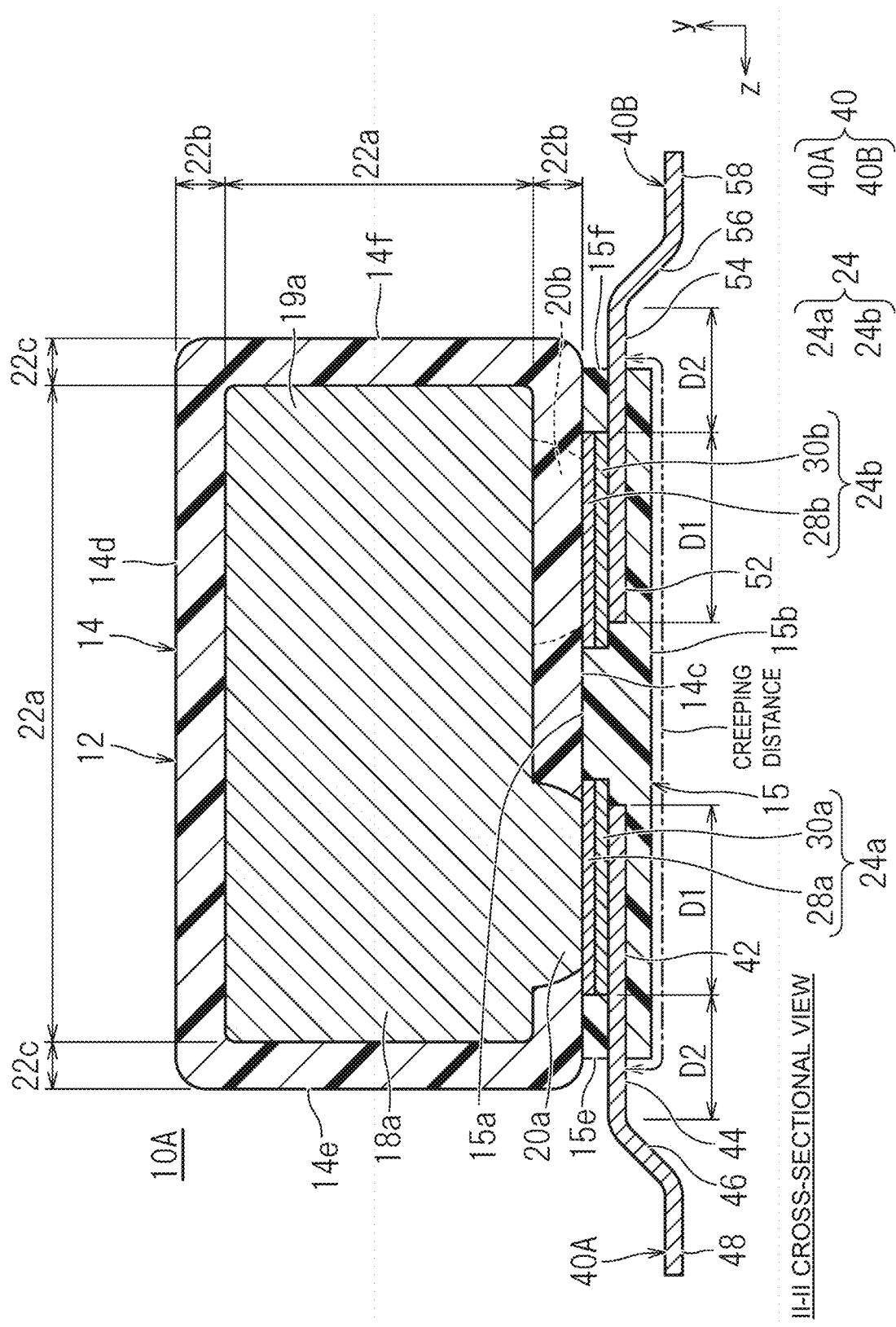
FIG. 2 is a cross-sectional view taken along a line II-II in FIG. 1.
Figure 3:
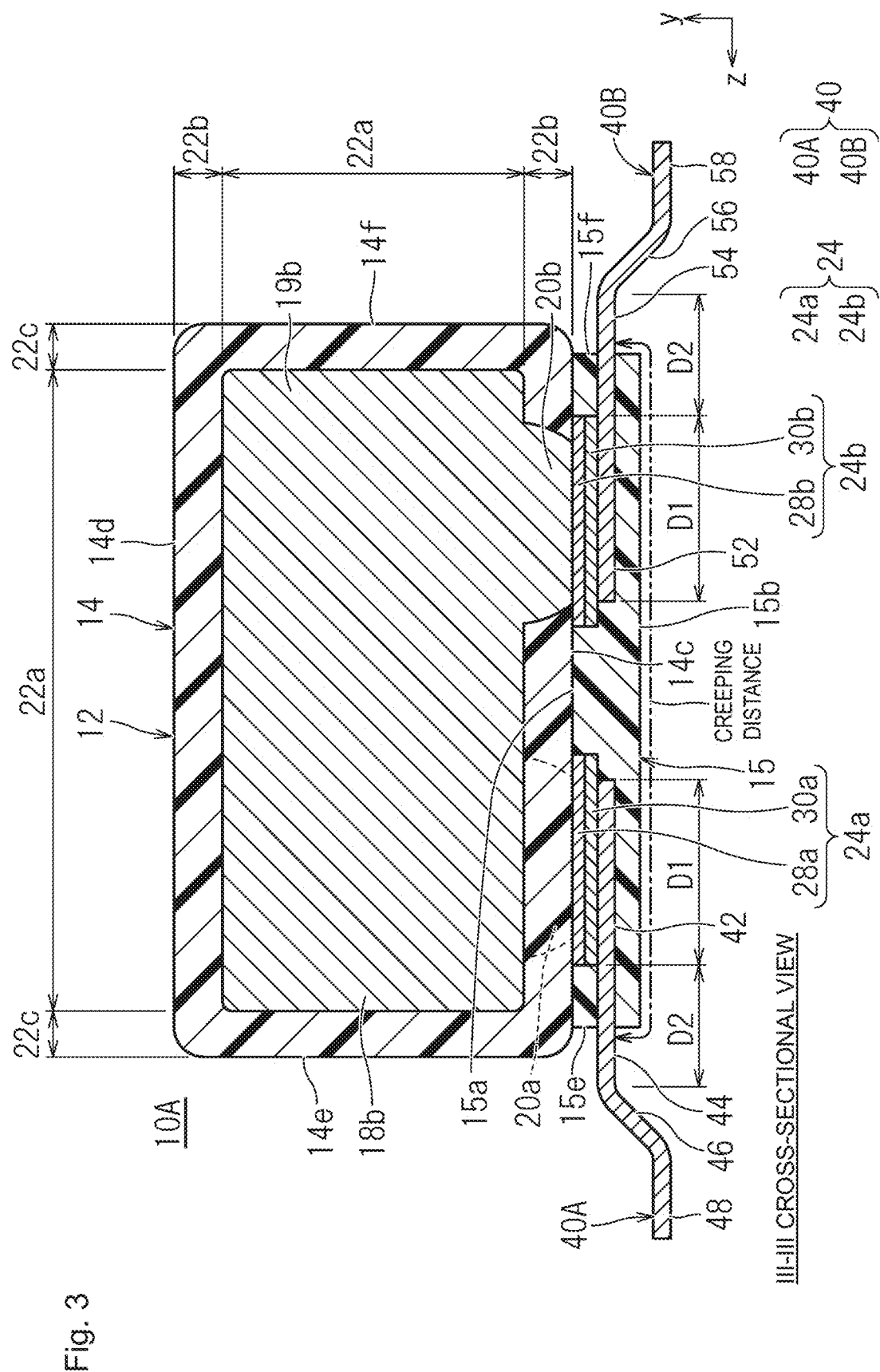
FIG. 3 is a cross-sectional view taken along a line III-III in FIG. 1.
Figure 4:
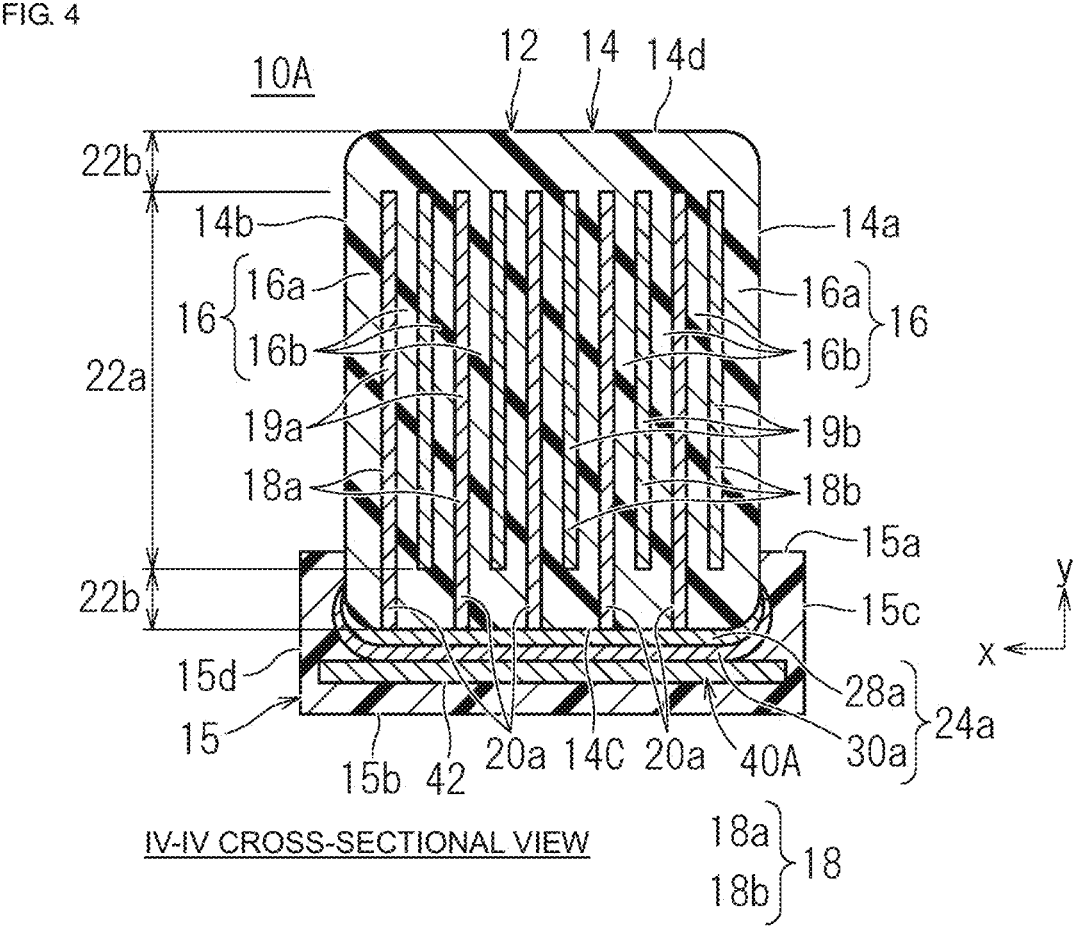
FIG. 4 is a cross-sectional view taken along a line IV-IV in FIG. 1.
Figure 5:
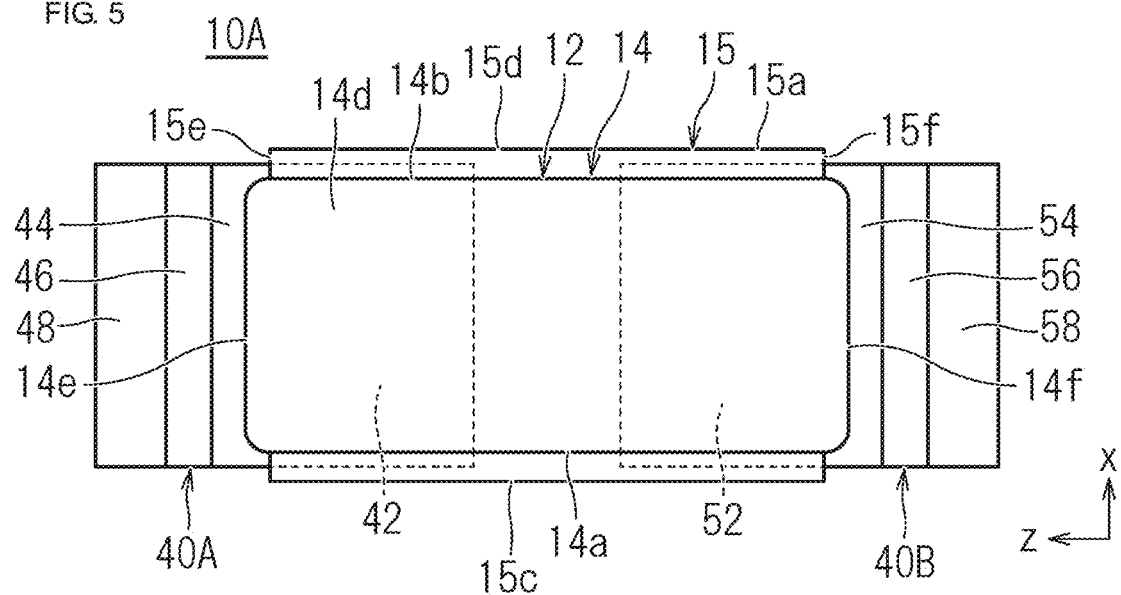
FIG. 5 is a plan view of the multilayer ceramic electronic component illustrated in FIG. 1.

A multilayer ceramic electronic component according to a first preferred embodiment of the present invention will be described below. FIG. 1 is an external perspective view illustrating an example of a multilayer ceramic electronic component according to the first preferred embodiment of the present invention. FIG. 2 is a cross-sectional view taken along a line II-II in FIG. 1, and FIG. 3 is a cross-sectional view taken along a line III-III in FIG. 1. FIG. 4 is a cross-sectional view taken along a line IV-IV in FIG. 1, and FIG. 5 is a plan view of the multilayer ceramic electronic component illustrated in FIG. 1.

As illustrated in FIG. 1, a multilayer ceramic electronic component 10A includes, for example, an electronic component main body 12, a first metal terminal 40A and a second metal terminal 40B, and an exterior material 15. The electronic component main body 12 and the first metal terminal 40A are connected with a bonding material, and the electronic component main body 12 and the second metal terminal 40B are also connected with a bonding material.

The electronic component main body 12 includes a multilayer body 14 preferably having, for example, a rectangular or substantially rectangular parallelepiped shape. The multilayer body 14 includes a plurality of ceramic layers 16 that are laminated and a plurality of inner electrode layers 18 that are laminated. Further, the multilayer body 14 includes a first principal surface 14a and a second principal surface 14b opposing each other in a lamination direction x, a first side surface 14c and a second side surface 14d opposing each other in a width direction y orthogonal or substantially orthogonal to the lamination direction x, and a first end surface 14e and a second end surface 14f opposing each other in a lengthwise direction z orthogonal or substantially orthogonal to both the lamination direction x and the width direction y.

As illustrated in FIG. 2 and FIG. 3, the electronic component main body 12 includes a first outer electrode 24a disposed at least on the first side surface 14c, and a second outer electrode 24b that is spaced apart from the first outer electrode 24a and is disposed at least on the first side surface 14c.

The electronic component main body 12 is disposed such that the first side surface 14c or the second side surface 14d opposes a mounting surface of a mounting substrate on which the multilayer ceramic electronic component 10A is to be mounted, in other words, in parallel or substantially in parallel to the mounting surface.

It is preferable that corner portions and ridge portions of the multilayer body 14 are rounded. Note that the "corner portion" refers to a portion at which three surfaces of the multilayer body adjacent to one another intersect, and the "ridge portion" refers to a portion at which two surfaces of the multilayer body adjacent to each other intersect.

As illustrated in FIG. 4, the multilayer body 14 includes an outer layer portion 16a including multiple ceramic layers 16, and an inner layer portion 16b including a single or multiple ceramic layers 16 and multiple inner electrode layers 18 disposed on the single or multiple ceramic layers 16. The outer layer portion 16a is positioned on the first principal surface 14a side and the second principal surface 14b side of the multilayer body 14, and is an aggregate of the multiple ceramic layers 16 positioned between the first principal surface 14a and the inner electrode layer 18 closest to the first principal surface 14a, and of the multiple ceramic layers 16 positioned between the second principal surface 14b and the inner electrode layer 18 closest to the second principal surface 14b. A region sandwiched between both of the outer layer portions 16a is the inner layer portion 16b.

The ceramic layer 16 may preferably be made of, for example, a dielectric material. As the dielectric material, for example, dielectric ceramic containing an ingredient such as $BaTiO_3$, $CaTiO_3$, $SrTiO_3$, or $CaZrO_3$ may preferably be used. In the case in which the dielectric material is contained as a main ingredient, a material in which an ingredient such as a Mn compound, an Fe compound, a Cr compound, a Co compound, or a Ni compound, for example, is added in a smaller content than the content of the main ingredient may preferably be used, for example, in accordance with the desired characteristics of the electronic component main body 12.

In a case in which piezoelectric ceramic is used for the multilayer body 14, the electronic component main body defines and functions as a ceramic piezoelectric element. Specific examples of the piezoelectric ceramic material include a lead zirconate titanate (PZT) base ceramic material and other suitable materials.

In a case in which semiconductor ceramic is used for the multilayer body 14, the electronic component main body defines and functions as a thermistor element. Specific examples of the semiconductor ceramic material include a spinel-based ceramic material and other suitable materials.

In a case in which magnetic ceramic is used for the multilayer body 14, the electronic component main body defines and functions as an inductor element. In the case in which the electronic component main body defines and functions as an inductor element, the inner electrode layers 18 is preferably defined by a coil-shaped conductor, for example. Specific examples of the magnetic ceramic material include, for example, a ferrite ceramic material and other suitable materials.

It is preferable for a thickness of the ceramic layer 16 after firing to be equal to or larger than about 0.5 μm and equal to or smaller than about 40 μm, for example.

As illustrated in FIG. 2 and FIG. 3, the multilayer body 14 includes, as the multiple inner electrode layers 18, multiple first inner electrode layers 18a and multiple second inner electrode layers 18b each preferably having a rectangular or substantially rectangular shape, for example. The multiple first inner electrode layers 18a and the multiple second inner electrode layers 18b are buried so as to be alternately disposed at equal or substantially equal intervals along the lamination direction x of the multilayer body 14.

Each electrode surface of the first inner electrode layer 18a and the second inner electrode layer 18b is perpendicular or substantially perpendicular to a plane on which the first metal terminal 40A and the second metal terminal 40B extend, and is also perpendicular or substantially perpendicular to the mounting surface of the mounting substrate on which the multilayer ceramic electronic component 10A is to be mounted.

The first inner electrode layer 18a includes a first opposing section 19a opposing the second inner electrode layer 18b, and a first extended section 20a extending to at least a portion of the first side surface 14c. The second inner electrode layer 18b includes a second opposing section 19b opposing the first inner electrode layer 18a, and a second extended section 20b that does not overlap with the first extended section 20a of the first inner electrode layer 18a and that extends to at least a portion of the first side surface 14c. Specifically, the first extended section 20a of the first inner electrode layer 18a is exposed at a position on the left side of the first side surface 14c of the multilayer body 14. The second extended section 20b of the second inner electrode layer 18b is exposed at a position on the right side of the first side surface 14c of the multilayer body 14. Thus, achieved is a structure in which the first extended section 20a of the first inner electrode layer 18a and the second extended section 20b of the second inner electrode layer 18b are extended only to the first side surface 14c, and by covering the first side surface 14c portion with a non-conductive exterior material, a creeping distance of discharge is able to be efficiently increased.

Although the shapes of the first opposing section 19a, the second opposing section 19b, the first extended section 20a, and the second extended section 20b are not particularly limited, it is preferable that the shapes thereof are rectangular or substantially rectangular, for example. However, the corners may not be right angles, and may be rounded. Further, a connecting portion between the first opposing section 19a and the first extended section 20a may have a rectangular or substantially right-angled intersecting shape, or may have a rounded intersecting shape, for example.

In the first preferred embodiment, since the first extended section 20a of the first inner electrode layer 18a and the second extended section 20b of the second inner electrode layer 18b extend to the first side surface 14c of the multilayer body 14 opposing the mounting surface of the mounting substrate, the distance between the extended sections and the first and second metal terminals 40A and 40B respectively opposing each other becomes shorter, thus making it possible to obtain the effect of reduction in equivalent series inductance (ESL). In addition, by covering only the first side surface 14c portion with a non-conductive exterior material, a design is achieved in which the density of electrostatic capacitance is improved.

The multilayer body 14 includes, in the inner layer portion 16b of the ceramic layer 16, an opposing electrode section 22a at which the first opposing section 19a of the first inner electrode layer 18a and the second opposing section 19b of the second inner electrode layer 18b oppose each other. Further, the multilayer body 14 includes a side portion (hereinafter, referred to as a "W gap") 22b of the multilayer body 14 between one end in the width direction y of the opposing electrode section 22a and the first side surface 14c and between the other end in the width direction y of the opposing electrode section 22a and the second side surface 14d. Further, the multilayer body 14 includes an end portion (hereinafter, referred to as an "L gap") 22c of the multilayer body 14 between one end in the lengthwise direction z of the opposing electrode section 22a and the first end surface 14e and between the other end in the lengthwise direction z of the opposing electrode section 22a and the second end surface 14f.

The inner electrode layer 18 preferably contains, for example, a metal such as Ni, Cu, Ag, Pd or Au, or an alloy containing one of these metals, such as an Ag—Pd alloy. The inner electrode layer 18 may further contain dielectric particles based on the same composition as that of the ceramic contained in the ceramic layer 16.

It is preferable for a thickness of the inner electrode layer 18 to be equal to or larger than about 0.1 μm and equal to or smaller than about 2 μm, for example.

As illustrated in FIG. 2 and FIG. 3, an outer electrode 24 is disposed at the left side and right side of the first side surface 14c of the multilayer body 14. The outer electrode 24 includes the first outer electrode 24a and the second outer electrode 24b.

It is preferable that the first outer electrode 24a is disposed on the left side surface of the first side surface 14c of the multilayer body 14 and extends from the first side surface 14c and covers a portion of the first principal surface 14a and a portion of the second principal surface 14b. In this case, the first outer electrode 24a is electrically connected to the first extended section 20a of the first inner electrode 18a.

It is preferable that the second outer electrode 24b is disposed on the right side surface of the first side surface 14c of the multilayer body 14 and extends from the first side surface 14c and covers a portion of the first principal surface 14a and a portion of the second principal surface 14b. In this case, the second outer electrode 24b is electrically connected to the second extended section 20b of the second inner electrode 18b.

However, the first outer electrode 24a and the second outer electrode 24b may be provided only on the surface of the first side surface 14c.

In the multilayer body 14, at each of the opposing electrode sections 22a, the first opposing section 19a of the first inner electrode layer 18a and the second opposing section 19b of the second inner electrode layer 18b oppose each other with the inner layer portion 16b of the ceramic layer 16 interposed therebetween, thus providing electrostatic capacitance. Due to this, electrostatic capacitance is able to be obtained between the first outer electrode 24a to which the first inner electrode layer 18a is connected and the second outer electrode 24b to which the second inner electrode layer 18b is connected. Thus, the electronic component main body having the above-discussed structure defines and functions as a capacitor element.

As illustrated in FIG. 2 and FIG. 3, the first outer electrode 24a includes, in the order from the multilayer body 14 side, a first underlying electrode layer 28a and a first plating layer 30a disposed on a surface of the first underlying electrode layer 28a. Similarly, the second outer electrode 24b includes, in the order from the multilayer body 14 side, a second underlying electrode layer 28b and a second plating layer 30b disposed on a surface of the second underlying electrode layer 28b.

Each of the first underlying electrode layer 28a and the second underlying electrode layer 28b includes at least one layer selected from a group of a baked layer, a resin layer, a thin film layer, and other suitable layer.

The baked layer of each of the first underlying electrode layer 28a and the second underlying electrode layer 28b preferably contains, for example, glass and metal. As the metal of the baked layer, for example, at least one material selected from a group of Cu, Ni, Ag, Pd, an Ag—Pd alloy, Au, and other suitable material, for example, is preferably included. Further, as the glass of the baked layer, at least one material selected from a group of B, Si, Ba, Mg, Al, Li, and other suitable materials, for example, is preferably included.

In place of glass, a dielectric material of the same kind as that of the ceramic layer 16 may be used. The baked layer may include a plurality of layers. The baked layer is obtained by applying a conductive paste containing glass and metal to the multilayer body 14 and then baking the applied paste, and may be fired at the same time as the ceramic layer 16 and the inner electrode layer 18, or may be baked after the ceramic layer 16 and the inner electrode layer 18 are fired. In the case of being fired at the same time as the inner electrode layer 18, it is preferable to use a dielectric material of the same kind as that of the ceramic layer 16, instead of glass. It is preferable for a thickness of the thickest portion of the baked layer to be equal to or larger than about 10 μm and equal to or smaller than about 50 μm, for example.

Specifically, it is preferable that a thickness at the center portion in the lengthwise direction z of the baked layer provided on the first side surface 14c of the multilayer body 14 is equal to or larger than about 10 μm and equal to or smaller than about 30 μm, for example. In the case in which the baked layer extends from the first side surface 14c and covers a portion of the first principal surface 14a and a portion of the second principal surface 14b, it is preferable for a thickness thereof at the center portion in the width direction y to be equal to or larger than about 10 μm and equal to or smaller than about 50 μm, for example.

The resin layer of each of the first underlying electrode layer 28a and the second underlying electrode layer 28b preferably contains, for example, a conductive metal and a thermosetting resin. The resin layer may be provided on a surface of the baked layer, or may be directly provided on the surface of the first side surface 14c of the multilayer body 14 without providing a baked layer. Further, the resin layer may include a plurality of layers.

Since the resin layer contains a thermosetting resin, it is more flexible than a conductive layer made of, for example, a plating film or a fired material of a conductive paste. Accordingly, even if an impact caused by a physical impact or a thermal cycle is applied to the multilayer ceramic electronic component 10A, the resin layer defines and functions as a buffer layer to prevent the generation of cracks in the multilayer ceramic electronic component 10A.

As the conductive metal contained in the resin layer, Ag, Cu, or an alloy thereof, for example, is preferably used. In addition, a material in which the surface of conductive metal powder is coated with Ag may also be used. In the case in which the material in which the surface of conductive metal powder is coated with Ag is used, it is preferable to use Cu, Ni, or other suitable material, for example, as the conductive metal powder. It is also possible to use a material obtained by subjecting Cu to antioxidant treatment.

The reason why the conductive metal powder of Ag is preferably used for the conductive metal is as follows: since Ag has the lowest resistivity among metals, it is suitable for an electrode material; and since Ag is a precious metal, it is unlikely to be oxidized and has high resistance against oxidation. The reason for using the conductive metal coated with Ag is that the conductive metal of the base material is able to be made inexpensive while maintaining the characteristics of Ag.

It is preferable that the conductive metal contained in the resin layer is equal to or greater than about 35 vol % and equal to or smaller than about 75 vol %, for example, with respect to the total volume of the conductive resin. Since the shape of the conductive metal is not particularly limited, the shape of a conductive filler may be substantially spherical, flat, or other another suitable shape. In particular, it is preferable to use a mixture of a spherical filler and a flat filler. Since the average particle diameter of the conductive metal is not particularly limited, the average particle diameter of the conductive filler may be, for example, equal to or larger than about 0.3 μm and equal to or smaller than about 10 μm. The conductive metal mainly provide conductivity of the resin layer. To be specific, when the conductive fillers come into contact with each other, a conductive path is provided inside the resin layer.

The conductive metal contained in the resin layer may use conductive metal powder including one kind of conductive metal, or may use conductive metal powder including multiple kinds of conductive metals, that is, for example, a first conductive metal component and a second conductive metal component. In particular, in a case in which an underlying electrode layer is provided to define a conductive resin layer, it is preferable to use conductive metal powder including one kind of conductive metal.

In a case in which the conductive resin layer is provided without providing an underlying electrode layer, it is preferable to use conductive metal powder including the first conductive metal component and the second conductive metal component. In this case, for example, it is preferable for the melting point of the first conductive metal component to be relatively low, for example, equal to or lower than about 550° C., and more preferable to be equal to or higher than about 180° C. and equal to or lower than about 340° C. On the other hand, it is preferable for the melting point of the second conductive metal component to be relatively high, for example, equal to or higher than about 850° C. and equal to or lower than about 1050° C.

Preferably, the first conductive metal component is made of, for example, Sn, In, Bi, or an alloy containing at least one of these metals. In particular, it is more preferable for the first conductive metal component to be made of Sn or an alloy containing Sn, for example. Specific examples of the alloy containing Sn include Sn—Ag, Sn—Bi, Sn—Ag—Cu alloys, and other suitable alloys. The first conductive metal component softens and flows at a relatively low temperature during the heat treatment, and forms a compound with a metal of the inner electrode layer 18.

It is preferable for the second conductive metal component to be made of, for example, a metal such as Cu, Ag, Pd, Pt or Au, or an alloy containing at least one of these metals. In particular, it is preferable that the second conductive metal component be Cu or Ag, for example. The second conductive metal component primarily provides conductivity of the first conductive metal component. To be specific, when the second conductive metal components make contact with each other or the first conductive metal component and the second conductive metal component come into contact with each other, a conductive path is provided inside the outer electrode 24. Since the shape of the first conductive metal and the second conductive metal is not particularly limited, the shape of the conductive filler may be substantially spherical, flat, or other suitable shapes.

As the thermosetting resin of the resin layer, various known thermosetting resins, such as an epoxy resin, a phenol resin, a urethane resin, a silicone resin, and a polyimide resin may preferably be used, for example. Particularly, an epoxy resin having excellent heat resistance, moisture resistance, adhesiveness, and other favorable properties is one of the most suitable resins.

It is preferable that the thermosetting resin contained in the resin layer be contained in an amount of equal to or greater than about 25 vol % and equal to or smaller than about 65 vol %, for example, with respect to the total volume of the conductive resin. Further, it is preferable to contain a curing agent along with the thermosetting resin. In the case in which an epoxy resin is used as a base resin, various known compounds such as a phenol group, an amine group, an acid anhydride group, and an imidazole group, for example, may be used as a curing agent of the epoxy resin.

It is preferable for a thickness of the thickest portion of the resin layer to be equal to or larger than about 10 μm and equal to or smaller than about 50 μm, for example. It is preferable that a thickness at the center portion in the lengthwise direction z of the resin layer located on the first side surface 14c of the multilayer body 14 is equal to or larger than about 10 μm and equal to or smaller than about 30 μm, for example. In the case in which the resin layer extends from the first side surface 14c and covers a portion of the first principal surface 14a and a portion of the second principal surface 14b, it is preferable for a thickness thereof at the center portion in the width direction y to be equal to or larger than about 10 μm and equal to or smaller than about 50 μm, for example.

The thin film layer of each of the first underlying electrode layer 28a and the second underlying electrode layer 28b is preferably a layer equal to or smaller than about 1 μm, for example, in thickness, which is formed by a thin film formation method, such as a sputtering method or a vapor deposition method and in which metal particles are deposited.

The first plating layer 30a of the first outer electrode 24a covers the first underlying electrode layer 28a. Specifically, it is preferable that the first plating layer 30a is disposed on a surface of the first underlying electrode layer 28a at the left side of the first side surface 14c, and is provided on the surface of the first underlying electrode layer 28a so as to extend to the first principal surface 14a and the second principal surface 14b.

Similarly, the second plating layer 30b of the second outer electrode 24b covers the second underlying electrode layer 28b. Specifically, it is preferable that the second plating layer 30b is disposed on a surface of the second underlying electrode layer 28b at the right side of the first side surface 14c, and is provided on the surface of the second underlying electrode layer 28b so as to extend to the first principal surface 14a and the second principal surface 14b.

As the first plating layer 30a and the second plating layer 30b (hereinafter, simply referred to as "plating layer" as well), for example, at least one metal selected from a group of Cu, Ni, Ag, Pd, an Ag—Pd alloy, Au and other suitable metal, or an alloy containing the selected metal, for example, is preferably used.

The plating layer may include a plurality of layers. In this case, it is preferable for the plating layer to have a two-layer structure of a Ni plating layer and a Sn plating layer, for example. The Ni plating layer, by being provided to cover the surface of the underlying electrode layer, is used to prevent the electronic component main body 12 from being eroded by solder when bonded to the metal terminals 40A and 40B. Further, by providing the Sn plating layer on a surface of the Ni plating layer, when the electronic component main body 12 is bonded to the metal terminals 40A and 40B, wettability of the solder used to mount is improved so that the mounting is able to be performed with ease.

It is preferable for a thickness per layer of the plating layer to be equal to or larger than about 1 μm and equal to or smaller than about 15 μm, for example. It is preferable that a thickness at the center portion in the lengthwise direction z of the plating layer located on the first side surface 14c of the multilayer body 14 be equal to or larger than about 1 μm and equal to or smaller than about 10 μm, for example. In the case in which the plating layer extends from the first side surface 14c and covers a portion of the first principal surface 14a and a portion of the second principal surface 14b, it is preferable for a thickness thereof at the center portion in the width direction y to be equal to or larger than about 1 μm and equal to or smaller than about 15 μm, for example.

Each of the first outer electrode 24a and the second outer electrode 24b may be configured such that, without providing an underlying electrode layer, the plating electrode layer is directly provided on the surface of the first side surface 14c of the multilayer body 14 to be electrically connected to the first inner electrode 18a or the second inner electrode 18b. In this case, a catalyst is disposed, as a pretreatment, on the surface of the first side surface 14c of the multilayer body 14, and then the plating electrode layer is provided.

It is preferable for the plating electrode layer to include a lower layer plating electrode provided on the surface of the first side surface 14c of the multilayer body 14 and an upper layer plating electrode provided on a surface of the lower layer plating electrode. It is preferable that the lower layer plating electrode and the upper layer plating electrode include, for example, at least one metal selected from a group of Cu, Ni, Sn, Pb, Au, Ag, Pd, Bi, Zn and other suitable metal, or an alloy containing the selected metal, for example.

It is preferable that the lower layer plating electrode is made using Ni having solder barrier performance, for example. It is preferable that the upper layer plating electrode is made using Sn, Au, or other material having excellent solder wettability. In a case in which the inner electrode 18 is made using Ni, it is preferable for the lower layer plating electrode to be made using Cu having an excellent bonding property with respect to Ni, for example. It is sufficient that the upper layer plating electrode is provided as necessary, and the first outer electrode 24a and the second outer electrode 24b may include only the lower layer plating electrode. The upper layer plating electrode may be used as an outermost layer, or another plating electrode may further be provided on a surface of the upper layer plating electrode.

It is preferable for a thickness per layer of the plating electrode layer to be equal to or larger than about 1 μm and equal to or smaller than about 15 μm, for example. It is preferable for the plating electrode layer not to contain glass. Further, it is preferable for the plating electrode layer to have a metal ratio of equal to or greater than about 99 vol % per unit volume, for example.

As illustrated in FIG. 2 and FIG. 3, the first metal terminal 40A is connected, with a bonding material, to the first outer electrode 24a located at the left side of the first side surface 14c of the electronic component main body 12. The second metal terminal 40B is connected, with a bonding material, to the second outer electrode 24b located at the right side of the first side surface 14c of the electronic component main body 12.

It is preferable for the bonding material to be solder, for example, and particularly preferable to be a Pb-free solder having a high melting point, for example. Thus, it is possible to secure the heat resistance of the bonding portion with respect to a flow or reflow temperature at the time of mounting the electronic component main body 12 on the substrate, while securing the bonding strength between the electronic component main body 12 and the first metal terminal 40A as well as the second metal terminal 40B. As the Pb-free solder having a high melting point, lead-free solder based on, for example, Sn—Sb, Sn—Ag—Cu, Sn—Cu, Sn—Bi, or other suitable materials, for example, is preferable. In particular, solder of Sn-10Sb to Sn-15Sb, for example, is preferable. Thus, the heat resistance of the bonding portion at the mounting time is able to be secured.

The first metal terminal 40A and the second metal terminal 40B (hereinafter, simply referred to as "metal terminal 40" as well) are provided to surface-mount the multilayer ceramic electronic component 10A on the mounting substrate. For example, a plate-shaped lead frame is used as the metal terminal 40. The metal terminal 40 defined by plate-shaped lead frame includes a first principal surface 400 connected to the outer electrode 24, a second principal surface (a surface on the opposite side to the electronic component main body 12) 402 opposing the first principal surface 400, and a perimeter surface 404 providing a thickness between the first principal surface 400 and the second principal surface 402.

The first metal terminal 40A includes a first bonding portion 42 connected to the first outer electrode 24a and opposing the first side surface 14c or the second side surface 14d, a first extension portion 44 connected to the first bonding portion 42 and extending in a direction parallel or substantially parallel to the first side surface 14c of the multilayer body 14 (the side surface on the mounting surface side) so as to be distanced from the electronic component main body 12 to the left side thereof in the lengthwise direction z connecting the first end surface 14e and the second end surface 14f, a second extension portion 46 connected to the first extension portion 44 and extending toward a side of the mounting surface of the mounting substrate located on the opposite side to the electronic component main body 12 in order to provide a gap between the first side surface 14c and the mounting surface, and a first mounting portion 48 connected to the second extension portion 46 and configured to be mounted on the mounting substrate. However, the configuration of the extension portion is not limited to the above-described configuration, and may further include a curved extension portion.

The second metal terminal 40B includes a second bonding portion 52 connected to the second outer electrode 24b and opposing the first side surface 14c or the second side surface 14d, a third extension portion 54 connected to the second bonding portion 52 and extending in a direction parallel or substantially parallel to the first side surface 14c of the multilayer body 14 (the side surface on the mounting surface side) so as to be distanced from the electronic component main body 12 to the right side thereof in the lengthwise direction z connecting the first end surface 14e and the second end surface 14f, a fourth extension portion 56 connected to the third extension portion 54 and extending toward the side of the mounting surface of the mounting substrate located on the opposite side to the electronic component main body 12 in order to provide a gap between the first side surface 14c and the mounting surface, and a second mounting portion 58 connected to the fourth extension portion 56 and configured to be mounted on the mounting substrate. However, the configuration of the extension portion is not limited to the above-described configuration, and may further include a curved extension portion.

The first bonding portion 42 of the first metal terminal 40A is connected to the first outer electrode 24a provided at the left side of the first side surface 14c of the electronic component main body 12 so as to extend in the lengthwise direction z connecting the first end surface 14e and the second end surface 14f. It is sufficient for the first bonding portion 42 to be connected so as to correspond to the first outer electrode 24a, and it is preferable that the first bonding portion 42 covers the entire or substantially the entire surface of the first outer electrode 24a. In other words, it is preferable that the first bonding portion 42 is disposed such that the tip thereof does not protrude from the first outer electrode 24a in the lengthwise direction z connecting the first end surface 14e and the second end surface 14f, and corresponds to the length of the first outer electrode 24a. In addition, the first bonding portion 42 is designed such that its dimension is equal or substantially equal to the dimension of the first outer electrode 24a in the lamination direction x connecting the first principal surface 14a and the second principal surface 14b. With this, even lower equivalent series resistance (ESR) is able to be achieved.

The second bonding portion 52 of the second metal terminal 40B is connected to the second outer electrode 24b provided at the right side of the first side surface 14c of the electronic component main body 12 so as to extend in the lengthwise direction z connecting the first end surface 14e and the second end surface 14f. It is sufficient for the second bonding portion to be connected so as to correspond to the second outer electrode 24b, and it is preferable that the second bonding portion 52 covers the entire or substantially the entire surface of the second outer electrode 24b. In other words, it is preferable that the second bonding portion 52 is disposed so that the tip thereof does not protrude from the second outer electrode 24b in the lengthwise direction z connecting the first end surface 14e and the second end surface 14f, and corresponds to the length of the second outer electrode 24b. In addition, the second bonding portion 52 is designed such that its dimension is equal or substantially equal to the dimension of the second outer electrode 24b in the lamination direction x connecting the first principal surface 14a and the second principal surface 14b. With this, even lower equivalent series resistance (ESR) is able to be achieved.

The first extension portion 44 of the first metal terminal 40A is connected to one end of the first bonding portion 42 and extends in a direction parallel or substantially parallel to the first side surface 14c of the multilayer body 14 so as to be distanced from the electronic component main body 12 toward the left side thereof in the lengthwise direction z connecting the first end surface 14e and the second end surface 14f. The third extension portion 54 of the second metal terminal 40B is connected to one end of the second bonding portion 52 and extends in the direction parallel or substantially parallel to the first side surface 14c of the multilayer body 14 so as to be distanced from the electronic component main body 12 toward the right side thereof in the lengthwise direction z connecting the first end surface 14e and the second end surface 14f.

Thus, the distance covered by the exterior material 15 is able to be increased. As a result, it is possible to secure an insulating surface distance (creeping distance) between the first metal terminal 40A and the second metal terminal 40B. It is also possible to secure a bending allowance at the time of bending the first metal terminal 40A and the second metal terminal 40B.

In the lengthwise direction z connecting the first end surface 14e and the second end surface 14f, it is preferable for a length D2 of the first extension portion 44 of the first metal terminal 40A to be shorter than a length D1 of the first bonding portion 42 thereof. Specifically, it is preferable for the length D2 of the first extension portion 44 to be equal to or more than about 50% and equal to or less than about 90% of the length D1 of the first bonding portion 42, for example. Similarly, it is preferable for a length D2 of the second extension portion 54 of the second metal terminal 40B to be shorter than a length D1 of the second bonding portion 52 thereof. Specifically, it is preferable for the length D2 of the second extension portion 54 to be equal to or more than about 50% and equal to or less than about 90% of the length D1 of the second bonding portion 52. With this, it is possible to secure a resin inflow port for resin molding of the exterior material 15 on the lower side, thus making it possible to obtain improved or optimum resin fluidity. Further, it is possible to reduce the amount of material of the metal terminal 40, and thus it is possible to reduce costs.

In addition, in the lamination direction x connecting the first principal surface 14a and the second principal surface 14b, the first extension portion 44 and the second extension portion 54 may be extended in the same lengths as those of the first bonding portion 42 and the second bonding portion 52, respectively. However, their lengths may gradually be shortened in a stepwise manner, or may be shortened in a tapered manner.

The surface of a portion of the first extension portion 44 and the surface of a portion of the second extension portion 54 may have a concave shape, and the base material of the metal terminal 40 may be exposed in the portion. In the portion in the concave shape at which the base material of the metal terminal 40 is exposed, since the solder wettability decreases, even if the bonding material in the first bonding portion 42 or the second bonding portion 52 is melted, the melted bonding material is prevented from flowing out by the portion in the concave shape, such that the melted bonding material is able to be prevented from flowing out to the outside of the exterior material 15.

Further, a cutout portion may be provided in the first extension portion 44 and the second extension portion 54. This makes it possible to reduce the amount of material of the metal terminal 40, and thus it is possible to reduce costs. In addition, after the mounting of the multilayer ceramic electronic component 10A on the mounting substrate, it is possible to relieve the stress from the mounting substrate.

The second extension portion 46 of the first metal terminal 40A is connected to the first extension portion 44 and extends in a direction toward the mounting surface of the mounting substrate so as to provide a gap between the first side surface 14c and the mounting surface. To be specific, the second extension portion 46 bends from a terminal portion of the first extension portion 44 and extends in the direction toward the mounting surface. The fourth extension portion 56 of the second metal terminal 40B is connected to the second extension portion 54 and extends in the direction toward the mounting surface of the mounting substrate so as to provide a gap between the first side surface 14c and the mounting surface. To be specific, the fourth extension portion 56 bends from a terminal portion of the second extension portion 54 and extends in the direction toward the mounting surface. The angle of the curved portion may be such that the curved portion may be gradually curved, or may be curved to be vertical or substantially vertical.

In the lamination direction x connecting the first principal surface 14a and the second principal surface 14b, although the length of the second extension portion 46 and the length of the fourth extension portion 56 are not particularly limited, it is preferable that the second extension portion 46 and the fourth extension portion 56 have the same or substantially the same lengths as those of the first extension portion 44 and the third extension portion 54, respectively.

Figure 6:
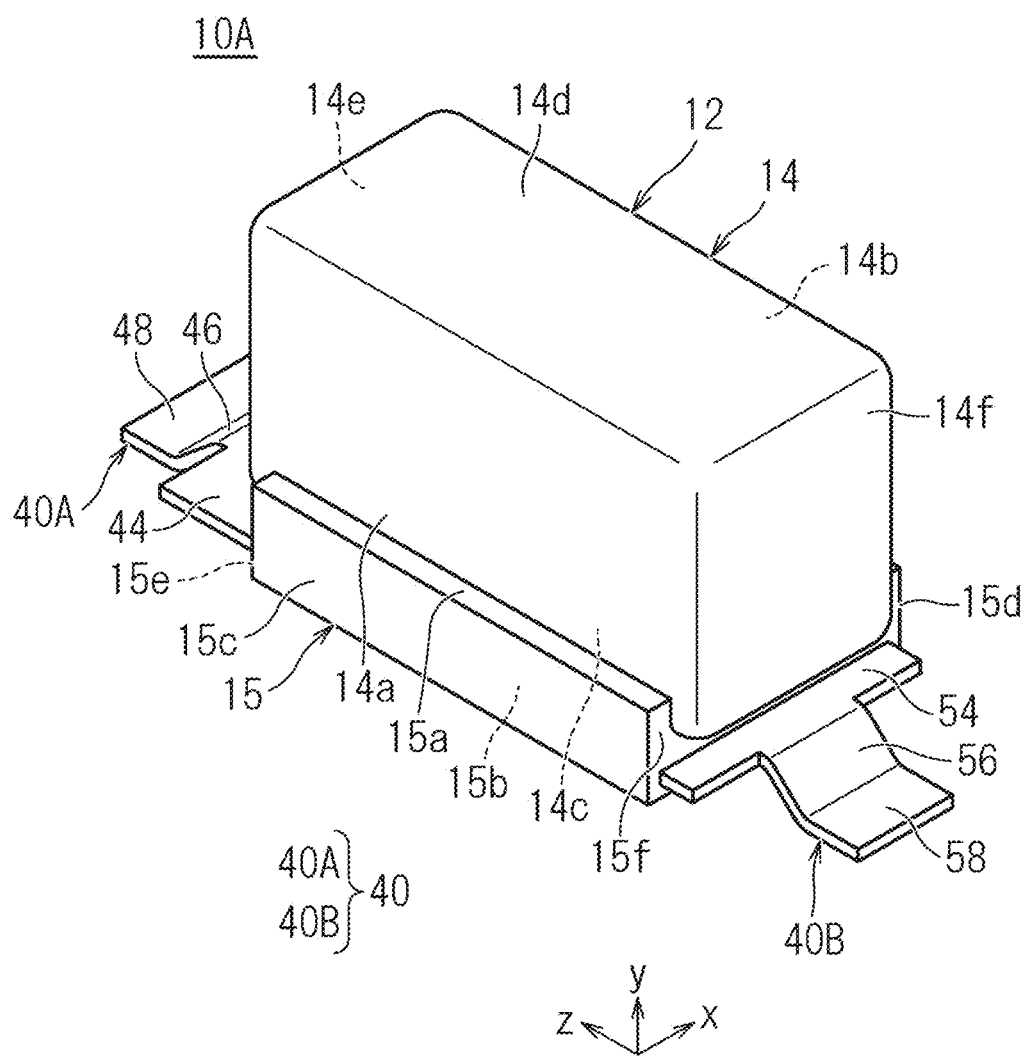
FIG. 6 is an external perspective view illustrating a variation on the multilayer ceramic electronic component illustrated in FIG. 1.

However, as illustrated in FIG. 6, in the lamination direction x connecting the first principal surface 14a and the second principal surface 14b, the length of the second extension portion 46 and the length of the fourth extension portion 56 may be shorter than the length of the first extension portion 44 and the length of the third extension portion 54, respectively.

Although the length of the second extension portion 46 extending toward the mounting surface and the length of the fourth extension portion 56 extending toward the mounting surface are not particularly limited, it is preferable that a gap provided between the exterior material 15 to be described later and the mounting surface of the mounting substrate is equal to or larger than about 0.15 mm and equal to or smaller than about 2 mm, for example. Since the electronic component main body 12, the first side surface 14c of which is covered with the exterior material 15, is floated above the mounting surface of the mounting substrate, it is possible to lengthen the distance between the electronic component main body 12 and the mounting substrate, and thus it is possible to relieve the stress from the mounting substrate. Further, the thickness of the exterior material 15 that is disposed on the first side surface 14c at the lower side of the electronic component main body 12 is able to be increased, thus making it possible to secure the insulation property.

The surface of a portion of the second extension portion 46 and the surface of a portion of the fourth extension portion 56 may have a concave shape, and the base material of the metal terminal 40 may be exposed in the portion. In the portion in the concave shape at which the base material of the metal terminal 40 is exposed, since the solder wettability decreases, even if the bonding material in the first bonding portion 42 or the second bonding portion 52 is melted, the melted bonding material is prevented from flowing out by the portion in the concave shape, thus the melted bonding material is able to be prevented from flowing out to the outside of the exterior material 15.

Further, a cutout portion may be provided in the central portion of the second extension portion 46 and the central portion of the fourth extension portion 56, and each of the second extension portion 46 and the fourth extension portion 56 may be divided into two or more segments. With this, after the mounting of the multilayer ceramic electronic component 10A on the mounting substrate, it is possible to relieve the stress from the mounting substrate.

In addition, in the lamination direction x connecting the first principal surface 14a and the second principal surface 14b, a cutout 410 different from the above-described cutout portion may be provided in a portion of both end portions of the second extension portion 46 and in a portion of both end portions of the fourth extension portion 56 (see FIG. 1). As a result, it is possible to secure material clearance at the time of bending the metal terminal 40, and thus it is possible to obtain preferable bendability.

The first mounting portion 48 of the first metal terminal 40A is connected to the second extension portion 46 and configured to be mounted on the mounting substrate, and extends parallel or substantially parallel to the mounting surface. The second mounting portion 58 of the second metal terminal 40B is connected to the fourth extension portion 56 and configured to be mounted on the mounting substrate, and extends parallel or substantially parallel to the mounting surface.

Each of the first mounting portion 48 of the first metal terminal 40A and the second mounting portion 58 of the second metal terminal 40B may preferably have a continuous or substantially continuous rectangular shape, for example. Further, a cutout may be provided in the central portion of each of the first mounting portion 48 and the second mounting portion 58, so that the mounting portion may be divided into a shape having two or more branches. This makes it possible to reduce the amount of material of the metal terminal 40 and reduce costs. In addition, after the mounting of the multilayer ceramic electronic component 10A on the mounting substrate, it is possible to relieve the stress from the mounting substrate.

Although the cutout may be provided in the central portion of each of the first mounting portion 48 and the second mounting portion 58, it is preferable that an end portion of the first mounting portion 48 located in an outermost side portion and an end portion of the second mounting portion 58 located in an outermost side portion are aligned with the end portion of the second extension portion 46 and the end portion of the fourth extension portion 56, respectively.

In the lamination direction x connecting the first principal surface 14a and the second principal surface 14b, although the length of the first mounting portion 48 and the length of the second mounting portion 58 are not particularly limited, it is preferable that the first mounting portion 48 and the second mounting portion 58 have the same or substantially the same lengths as those of the second extension portion 46 and the fourth extension portion 56, respectively.

Further, in the lamination direction x connecting the first principal surface 14a and the second principal surface 14b, it is preferable that the length of the first mounting portion 48 and the length of the second mounting portion 58 be set to satisfy a relationship of "an area of the mounting portion of the metal terminal 40 on the bottom of the multilayer ceramic electronic component 10A ($mm^2$)≥weight of the multilayer ceramic electronic component 10A (g)×2/cohesive force of the solder". With this, since it is possible to sufficiently secure the adhesive strength between the mounting substrate and the multilayer ceramic electronic component 10A with respect to the gravitational mass of the multilayer ceramic electronic component 10A, it is possible to reduce or prevent detachment of the multilayer ceramic electronic component 10A from the mounting substrate. The cohesive force of the solder is defined as a force of a case in which the multilayer ceramic electronic component 10A is peeled off the mounting substrate from the solder, as a point of origin, with which the multilayer ceramic electronic component 10A is mounted when the multilayer ceramic electronic component 10A is pulled from the mounting substrate by a tensile test.

The first metal terminal 40A and the second metal terminal 40B each include a terminal main body and a plating film provided on a surface of the terminal main body.

It is preferable that the terminal main body is made of, for example, Ni, Fe, Cu, Ag or Cr, or an alloy containing one or more of these metals as a main ingredient. Specifically, for example, the metal of the base material of the terminal main body may preferably be an Fe-42Ni alloy, an Fe-18Cr alloy, a Cu-8Sn alloy, or other suitable material. From the viewpoint of heat dissipation, for example, oxygen-free copper, a Cu-based alloy, or other suitable material having high thermal conductivity is preferable. As described above, by using a copper-based material having excellent thermal conductivity as the material of the metal terminal, it is possible to achieve low ESR, low thermal resistance, and other favorable properties.

It is preferable for the thickness of the terminal main body to be about 0.05 mm to about 0.5 mm, for example.

The plating film includes, for example, a lower layer plating film and an upper layer plating film.

The lower layer plating film is provided on the surface of the terminal main body, and the upper layer plating film is provided on a surface of the lower layer plating film. Each of the lower layer plating film and the upper layer plating film may include a plurality of plating layers.

Further, the plating film may not be provided at least on the first extension portion 44 and second extension portion 46 of the first metal terminal 40A, the perimeter surface 404 of the first mounting portion 48, the third extension portion 54 and fourth extension portion 56 of the second metal terminal 40B, and the perimeter surface 404 of the second mounting portion 58. With this, when the multilayer ceramic electronic component 10A is mounted on the mounting substrate using solder, it is possible to reduce or prevent wetting-rise of the solder with respect to the first metal terminal 40A and the second metal terminal 40B. Accordingly, since it is possible to reduce or prevent a situation in which the solder enters a space (floating portion) between the electronic component main body 12 and the first metal terminal 40A and second metal terminal 40B due to the wetting-rise, it is possible to prevent the floating portion from being filled with the solder. Thus, it is possible to sufficiently secure the space of the floating portion. Accordingly, since the first extension portion 44 and second extension portion 46 of the first metal terminal 40A, and the third extension portion 54 and fourth extension portion 56 of the second metal terminal 40B are likely to be elastically deformed, it is possible to further absorb mechanical strain generated in the ceramic layer 16 due to the application of AC voltage. With this, it is possible to prevent vibrations generated at this time from being transmitted to the mounting substrate via the outer electrode 24. Accordingly, by providing the first metal terminal 40A and the second metal terminal 40B, it is possible to more stably reduce or prevent the generation of acoustic noise. Note that the plating film may not be provided on the overall perimeter surface 404 of the first metal terminal 40A and the second metal terminal 40B.

In a case of removing the plating film provided on the first extension portion 44, the second extension portion 46 and the first mounting portion 48 of the first metal terminal 40A as well as the plating film formed on the third extension portion 54, the fourth extension portion 56 and the second mounting portion 58 of the second metal terminal 40B, or the plating film provided on the overall perimeter surface 404 of each of the first metal terminal 40A and the second metal terminal 40B, it is possible to consider a method in which the plating film is removed by machining (cutting, polishing), a method in which the plating film is removed by laser trimming, a method in which the plating film is removed using a plating remover (e.g., sodium hydroxide), or a method in which a portion of each of the first metal terminal 40A and second metal terminal 40B at which the plating film is not expected to be provided is covered with a resist film prior to providing the plating film on the first metal terminal 40A and second metal terminal 40B, the plating film is then provided on the first metal terminal 40A and second metal terminal 40B, and thereafter the resist film is removed.

It is preferable that the lower layer plating film is made of, for example, Ni, Fe, Cu, Ag or Cr, or an alloy containing one or more of these metals as a main ingredient. It is more preferable that the lower layer plating film be made of, for example, Ni, Fe or Cr, or an alloy containing one or more of these metals as a main component. By making the lower layer plating film from Ni, Fe or Cr having a high melting point, or an alloy containing one or more of these metals as a main ingredient, the heat resistance of the outer electrode 24 is able to be improved. It is preferable for a thickness of the lower layer plating film to be equal to or larger than about 0.2 μm and equal to or smaller than about 5.0 μm, for example.

It is preferable that the upper layer plating film is made of, for example, Sn, Ag or Au, or an alloy containing one or more of these metals as a main ingredient. More preferably, the upper layer plating film is made of, for example, Sn or an alloy containing Sn as a main ingredient. By making the upper layer plating film from Sn or an alloy containing Sn as a main ingredient, solderability between the outer electrode 24 and the first metal terminal 40A and second metal terminal 40B is able to be improved. The thickness of the upper layer plating film is preferably equal to or larger than about 1.0 μm and equal to or smaller than about 5.0 μm, for example.

The exterior material 15 includes a first principal surface 15a (a portion of which is slightly projected from the electronic component main body 12) and a second principal surface 15b opposing each other in the width direction y connecting the first side surface 14c and second side surface 14d of the electronic component main body 12, a first side surface 15c and a second side surface 15d opposing each other in the lamination direction x connecting the first principal surface 14a and second principal surface 14b of the electronic component main body 12, and a first end surface 15e and a second end surface 15f opposing each other in the lengthwise direction z connecting the first end surface 14e and second end surface 14f of the electronic component main body 12.

Although there is no particular limitation on the shape of the exterior material 15, it preferably has a rectangular or substantially rectangular parallelepiped shape, a substantially trapezoidal shape, or other suitable shape. The shape of the corner portion is not particularly limited, and may be rounded.

The exterior material 15 is formed by being coated with, for example, a silicone-based or epoxy-based resin in a state of liquid, powder, or other suitable state. In addition, an engineering plastic may be molded by an injection molding method, a transfer molding method, or other suitable method for the exterior material 15. In particular, it is preferable for the exterior material 15 to be made of a thermosetting epoxy resin, for example. Thus, the adhesion between the electronic component main body 12 and the metal terminal 40 is secured, thus improving the withstand voltage and moisture resistance performance.

In the exterior material 15, the first principal surface 15a is in contact with the first side surface 14c of the electronic component main body 12. Accordingly, the exterior material 15 covers a portion of the first side surface 14c of the electronic component main body 12, the first outer electrode 24a and the second outer electrode 24b, a portion of the first metal terminal 40A (the entirety or substantially the entirety of the first bonding portion 42 and a portion of the first extension portion 44), and a portion of the second metal terminal 40B (the entirety or substantially the entirety of the second bonding portion 52 and part of the third extension portion 54).

The first metal terminal 40A is extended from the first end surface 15e of the exterior material 15 in the lengthwise direction z (leftward direction) connecting the first end surface 14e and the second end surface 14f of the electronic component main body 12. The second metal terminal 40B is extended from the second end surface 15f of the exterior material 15 in the lengthwise direction z (rightward direction) connecting the first end surface 14e and the second end surface 14f of the electronic component main body 12.

In a preferred embodiment of the present invention, with the above-discussed configuration, the exterior material 15 covers a portion of the first side surface 14c of the electronic component main body 12, the first outer electrode 24a and the second outer electrode 24b, and a portion of the first metal terminal 40A and part of the second metal terminal 40B, wherein a long creeping distance (insulating surface distance) is able to be secured and the creeping discharge is able to be reduced or prevented.

Further, by using a multilayer ceramic capacitor instead of a film capacitor, it is possible to reduce the size of the multilayer ceramic electronic component 10A. Furthermore, providing the metal terminal 40 makes it possible to perform surface-mounting on the mounting substrate.

In the first preferred embodiment, the exterior material 15 covers only a portion of the multilayer body 14 positioned on the mounting surface side, and the outer electrode 24 and only a portion of the metal terminal 40 positioned on the mounting surface side. However, portions thereof other than the above-described portions are not covered by the exterior material 15. Accordingly, as compared with a case in which the entire or substantially the entire electronic component main body 12 is covered with the exterior material 15, the heat dissipation property is improved, and reduced costs achieved by reducing the materials is also obtained. Further, it is possible to omit the thickness of the portion at which the exterior material 15 is not provided in proportion to the amount of thickness of the exterior material 15, thus providing a margin for design. As a result, the degree of design freedom of the electronic component main body 12 is increased accordingly, so that the density of electrostatic capacitance is able to be improved, thus making it possible to obtain large capacitance.

Next, the multilayer ceramic electronic component 10A according to the first preferred embodiment will be described.

As illustrated in FIG. 1, surfaces opposing each other in a direction connecting the first end surface 14e and the second end surface 14f of the electronic component main body 12 (in other words, surfaces opposing each other in a direction in which the metal terminal 40 extends) are referred to as a first end surface and a second end surface of the multilayer ceramic electronic component 10A, respectively. In addition, surfaces opposing each other in a direction connecting the first principal surface 14a and the second principal surface 14b of the electronic component main body 12 are referred to as a first side surface and a second side surface of the multilayer ceramic electronic component 10A, respectively. Further, surface opposing each other in a direction connecting the first side surface 14c and the second side surface 14d of the electronic component main body 12 (in other words, surfaces opposing the mounting surface) are referred to as a first principal surface and a second principal surface of the multilayer ceramic electronic component 10A, respectively.

The dimension in the lengthwise direction z of an entity including the electronic component main body 12, the exterior material 15, the first metal terminal 40A, and the second metal terminal 40B is denoted as an L dimension of the multilayer ceramic electronic component 10A. To rephrase, the lengthwise direction z of the multilayer ceramic electronic component 10A extending in a direction connecting the first end surface 14e and the second end surface 14f of the electronic component main body 12 is defined as an L direction. It is preferable that the L dimension be equal to or larger than about 10 mm and equal to or smaller than about 15 mm, for example.

The dimension in the lamination direction x of the entity including the electronic component main body 12, the exterior material 15, the first metal terminal 40A, and the second metal terminal 40B is denoted as a W dimension of the multilayer ceramic electronic component 10A. To rephrase, the lamination direction x of the multilayer ceramic electronic component 10A extending in a direction connecting the first principal surface 14a and the second principal surface 14b of the electronic component main body is defined as a W direction. It is preferable that the W dimension be equal to or larger than about 3.0 mm and equal to or smaller than about 5.5 mm, for example.

The dimension in the width direction y of the entity including the electronic component main body 12, the exterior material 15, the first metal terminal 40A, and the second metal terminal 40B is denoted as a T dimension of the multilayer ceramic electronic component 10A. To rephrase, the width direction y of the multilayer ceramic electronic component 10A extending in a direction connecting the first side surface 14c and the second side surface 14d of the electronic component main body 12 is defined as a T direction. It is preferable that the T dimension be equal to or larger than about 1.0 mm and equal to or smaller than about 5.5 mm, for example.

Second Preferred Embodiment

Figure 7:
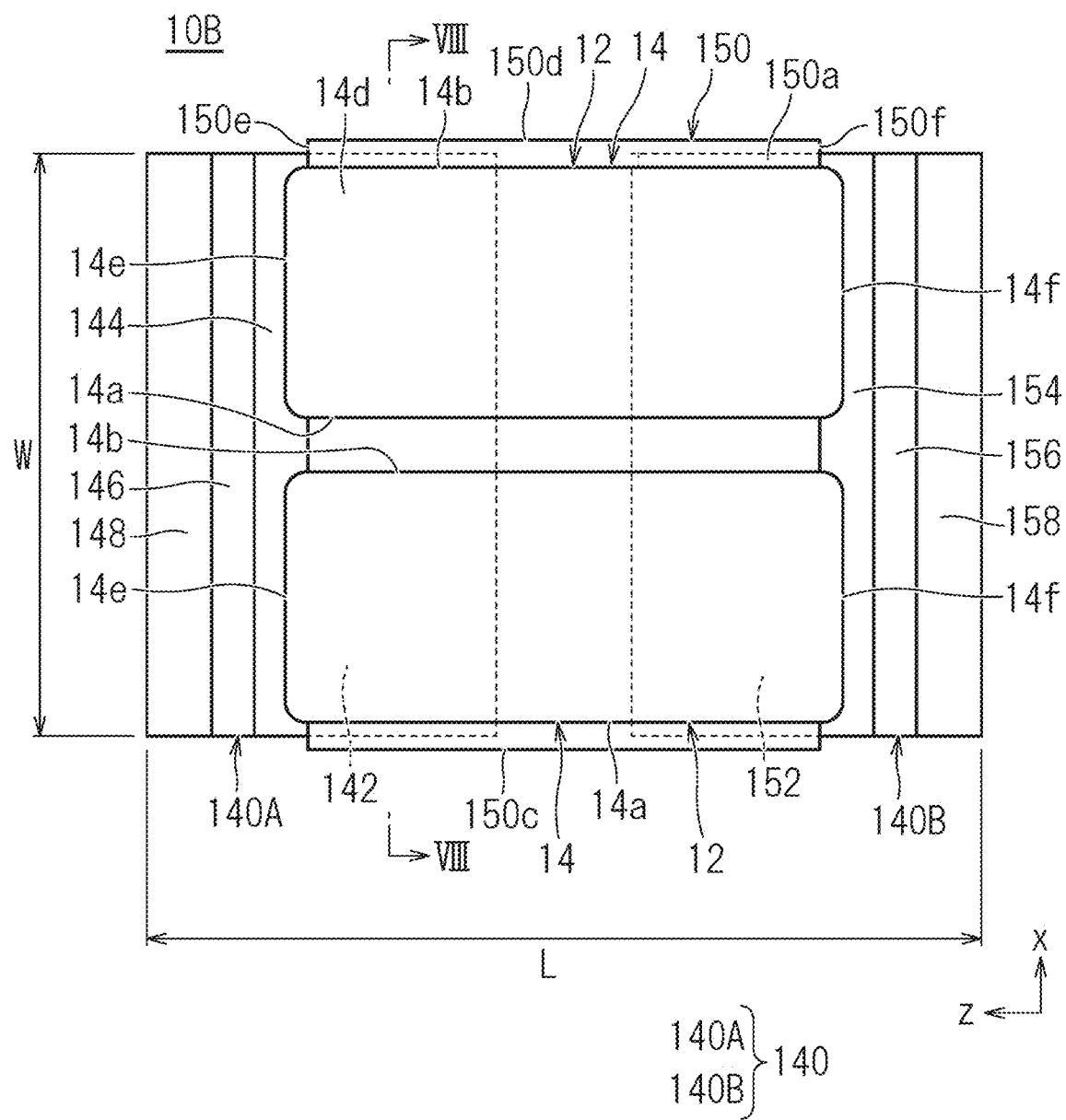
FIG. 7 is a plan view illustrating an example of a multilayer ceramic electronic component according to a second preferred embodiment of the present invention.
Figure 8:
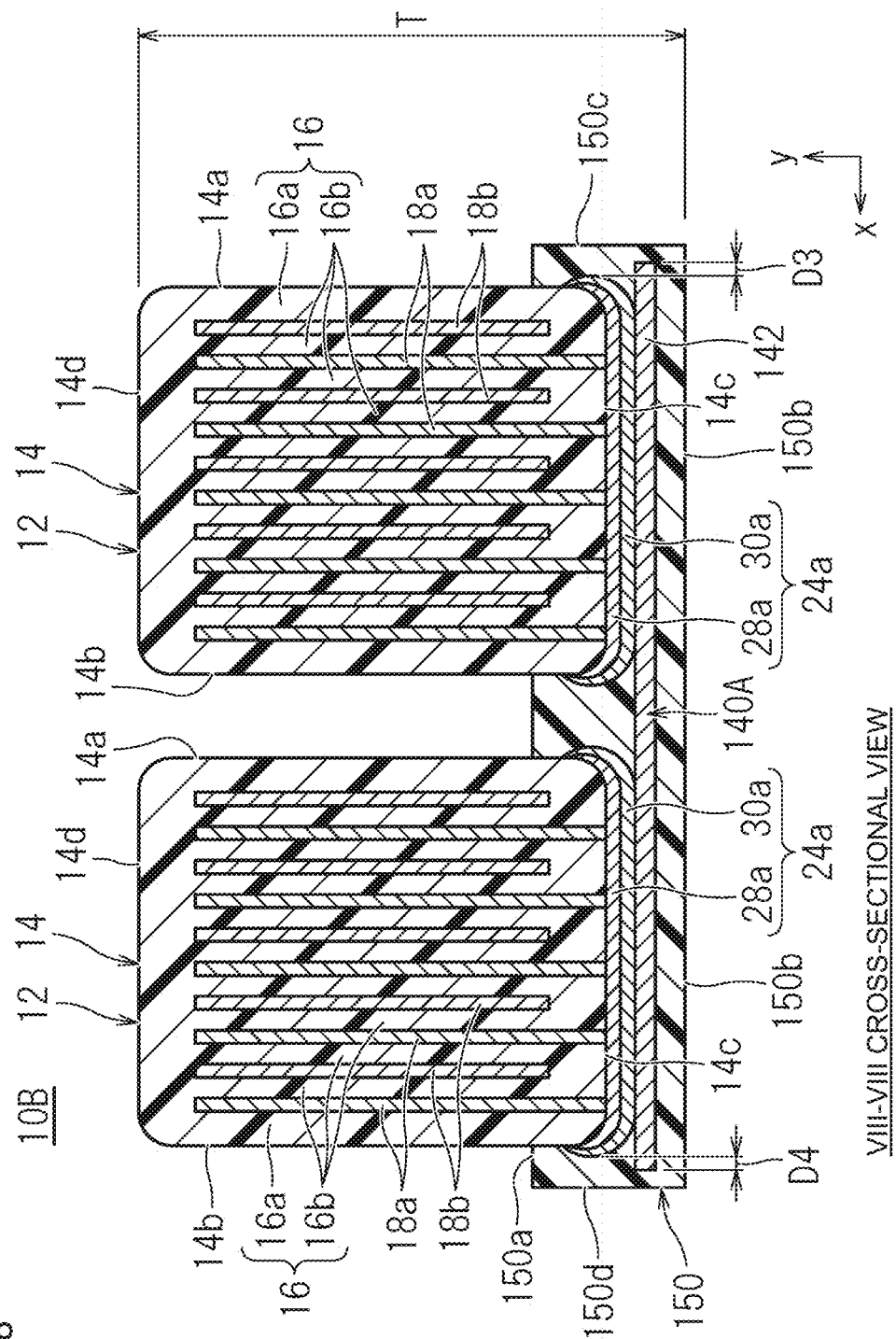
FIG. 8 is a cross-sectional view taken along a line VIII-VIII in FIG. 7.

A multilayer ceramic electronic component according to a second preferred embodiment of the present invention will be described below. FIG. 7 is a plan view illustrating an example of a multilayer ceramic electronic component according to the second preferred embodiment of the present invention. FIG. 8 is a cross-sectional view taken along a line VIII-VIII in FIG. 7.

In a multilayer ceramic electronic component 10B according to the second preferred embodiment, two of the electronic component main bodies 12 described in the first preferred embodiment are disposed in parallel or substantially in parallel and are spaced apart from each other. Accordingly, the same or corresponding elements as those of the electronic component main body 12 will be denoted by the same reference numerals, and description thereof will be omitted.

The two electronic component main bodies 12 are disposed such that the two first principal surfaces 14a, the two second principal surfaces 14b, or the first principal surface 14a and the second principal surface 14b oppose each other with a gap therebetween. It is preferable that the gap between the two electronic component main bodies 12 is equal to or larger than about 0.45 mm and equal to or smaller than about 1.0 mm, for example. Thus, heat insulating properties of the gap are secured, and heat generation of the resin is reduced or prevented.

Although the second preferred embodiment includes two of the electronic component main bodies 12, two or more of the electronic component main bodies 12 may be provided.

As illustrated in FIG. 7, the multilayer ceramic electronic component 10B includes two electronic component main bodies 12, a first metal terminal 140A and a second metal terminal 140B (hereinafter, also referred to as "metal terminal 140"), and an exterior material 150. The first metal terminal 140A and the second metal terminal 140B in the multilayer ceramic electronic component 10B are connected to the two electronic component main bodies 12 arranged side by side, and are provided to surface-mount the multilayer ceramic electronic component 10B on the mounting substrate. Specifically, the first metal terminal 140A extends to the respective first outer electrodes 24a of the two electronic component main bodies 12. The second metal terminal 140B extends to the respective second outer electrodes 24b of the two electronic component main bodies 12.

The first metal terminal 140A includes a first bonding portion 142 connected to the respective first outer electrodes 24a of the two electronic component main bodies 12 and opposing the first side surface 14c or the second side surface 14d, a first extension portion 144 connected to the first bonding portion 142 and extending in a direction parallel or substantially parallel to the first side surface 14c of the multilayer body 14 (the side surface on the mounting surface side) so as to be spaced apart from the electronic component main body 12 to the left side thereof in the lengthwise direction z connecting the first end surface 14e and the second end surface 14f, a second extension portion 146 connected to the first extension portion 144 and extending toward a side of the mounting surface located on the opposite side to the electronic component main body 12 in order to provide a gap between the first side surface 14c and the mounting surface of the mounting substrate; and a first mounting portion 148 connected to the second extension portion 146 and configured to be mounted on the mounting substrate.

The second metal terminal 140B includes a second bonding portion 152 connected to the respective second outer electrodes 24b of the two electronic component main bodies 12 and opposing the first side surface 14c or the second side surface 14d, a third extension portion 154 connected to the second bonding portion 152 and extending in a direction parallel or substantially parallel to the first side surface 14c of the multilayer body 14 (the side surface on the mounting surface side) so as to be spaced apart from the electronic component main body 12 to the right side thereof in the lengthwise direction z connecting the first end surface 14e and the second end surface 14f, a fourth extension portion 156 connected to the third extension portion 154 and extending toward the side of the mounting surface located on the opposite side to the electronic component main body 12 in order to provide a gap between the first side surface 14c and the mounting surface of the mounting substrate, and a second mounting portion 158 connected to the fourth extension portion 156 and configured to be mounted on the mounting substrate.

The first bonding portion 142 of the first metal terminal 140A extends in the lamination direction x connecting the first principal surface 14a and the second principal surface 14b so as to continuously or substantially continuously connect the first outer electrodes 24a provided at the left side of each of the first side surfaces 14c of the two electronic component main bodies 12. Although there is no particular limitation on the shape of the first bonding portion 142, it preferably has a rectangular or substantially rectangular shape continuously connecting the respective first outer electrodes 24a of the two electronic component main bodies 12. In this case, in the lamination direction x connecting the first principal surface 14a and the second principal surface 14b, it is preferable for the length of the first bonding portion 142 to be set so as to cover the overall first outer electrode 24a of each of the two electronic component main bodies 12. Specifically, the first bonding portion 142 extends from one of the electronic component main bodies 12 to the other one of the electronic component main bodies 12 so as to continuously or substantially continuously cover the first outer electrodes 24a including the gap between the two electronic component main bodies 12.

The second bonding portion 152 of the second metal terminal 140B extends in the lamination direction x connecting the first principal surface 14a and the second principal surface 14b so as to continuously or substantially continuously connect the second outer electrodes 24b provided at the right side of each of the first side surfaces 14c of the two electronic component main bodies 12. Although there is no particular limitation on the shape of the second bonding portion 152, it preferably has a rectangular or substantially rectangular shape capable of continuously connecting the respective second outer electrodes 24b of the two electronic component main bodies 12. In this case, in the lamination direction x connecting the first principal surface 14a and the second principal surface 14b, it is preferable for the length of the second bonding portion 152 to be set so as to cover the overall second outer electrode 24b of each of the two electronic component main bodies 12. Specifically, the second bonding portion 152 extends from one of the electronic component main bodies 12 to the other one of the electronic component main bodies 12 so as to continuously or substantially continuously cover the second outer electrodes 24b including the gap between the two electronic component main bodies 12.

To further rephrase, it is preferable for the first bonding portion 142 of the first metal terminal 140A to extend to the respective first outer electrodes 24a of the two electronic component main bodies 12. It is preferable for the second bonding portion 152 of the second metal terminal 140B to extend to the respective second outer electrodes 24b of the two electronic component main bodies 12.

In this case, as illustrated in FIG. 8, it is preferable that, in the lamination direction x connecting the first principal surface 14a and the second principal surface 14b, an end on one side (right end) of the first bonding portion 142 of the first metal terminal 140A projects from a right edge of the first outer electrode 24a positioned on the first side surface 14c of one (right side) of the electronic component main bodies 12 by a dimension D3 equal to or larger than about 0.05 mm and equal to or smaller than about 0.25 mm, for example. Similarly, it is preferable that an end on the other side (left end) of the first bonding portion 142 of the first metal terminal 140A projects from a left edge of the first outer electrode 24a positioned on the first side surface 14c of the other one (left side) of the electronic component main bodies 12 by a dimension D4 equal to or larger than about 0.05 mm and equal to or smaller than about 0.25 mm, for example. Further, it is preferable that a relationship between the second bonding portion 152 of the second metal terminal 140B and the second outer electrode 24b is similar to the above-described relationship. Thus, a bonding area between each of the electronic component main bodies 12 and the metal terminal 140 is able to be maintained constant, and the bonding strength and the resistance value of the metal terminal 140 is able to be controlled to fall within a set range.

Figure 9:
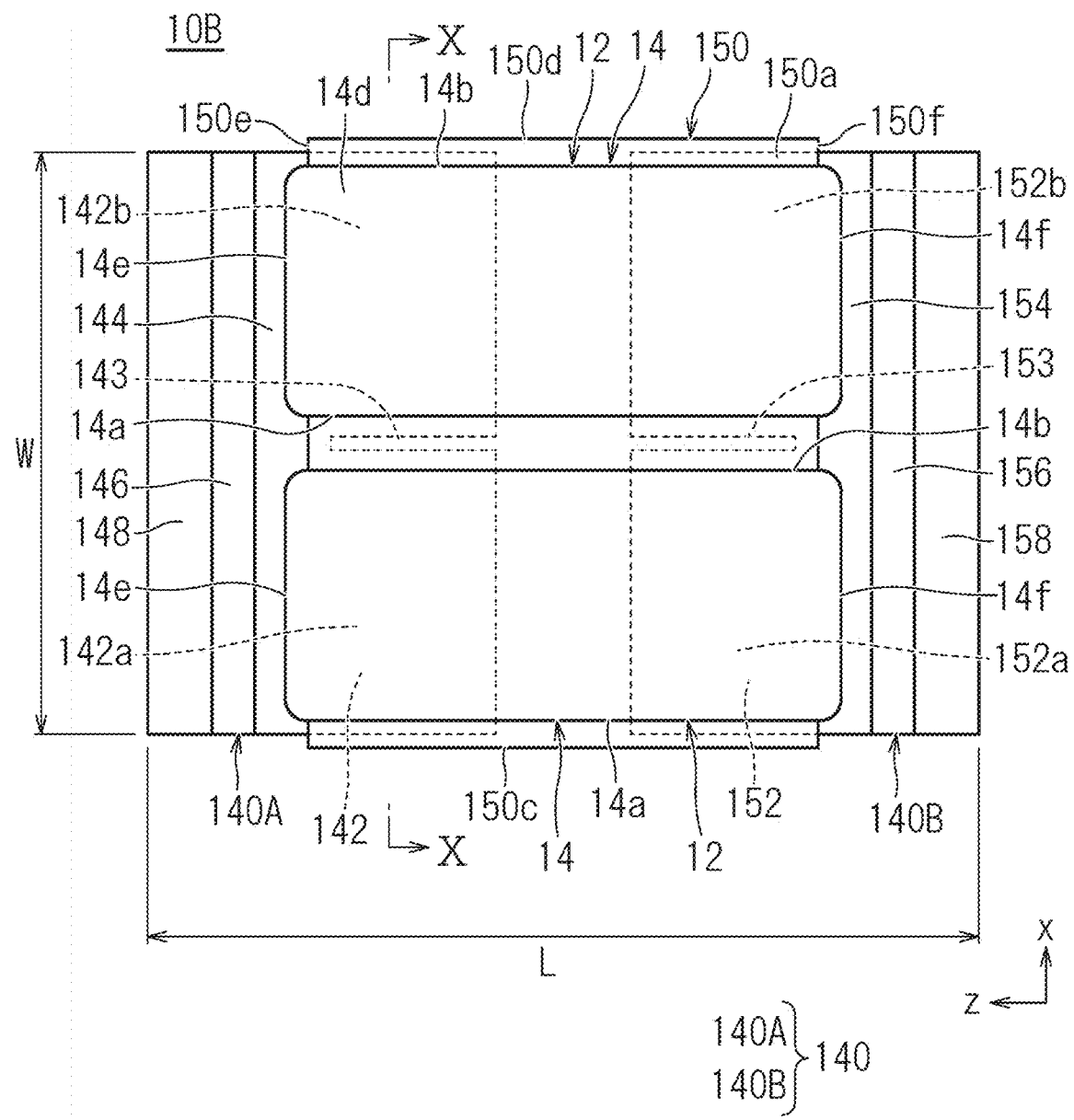
FIG. 9 is an external perspective view illustrating a variation on the multilayer ceramic electronic component illustrated in FIG. 7.
Figure 10:
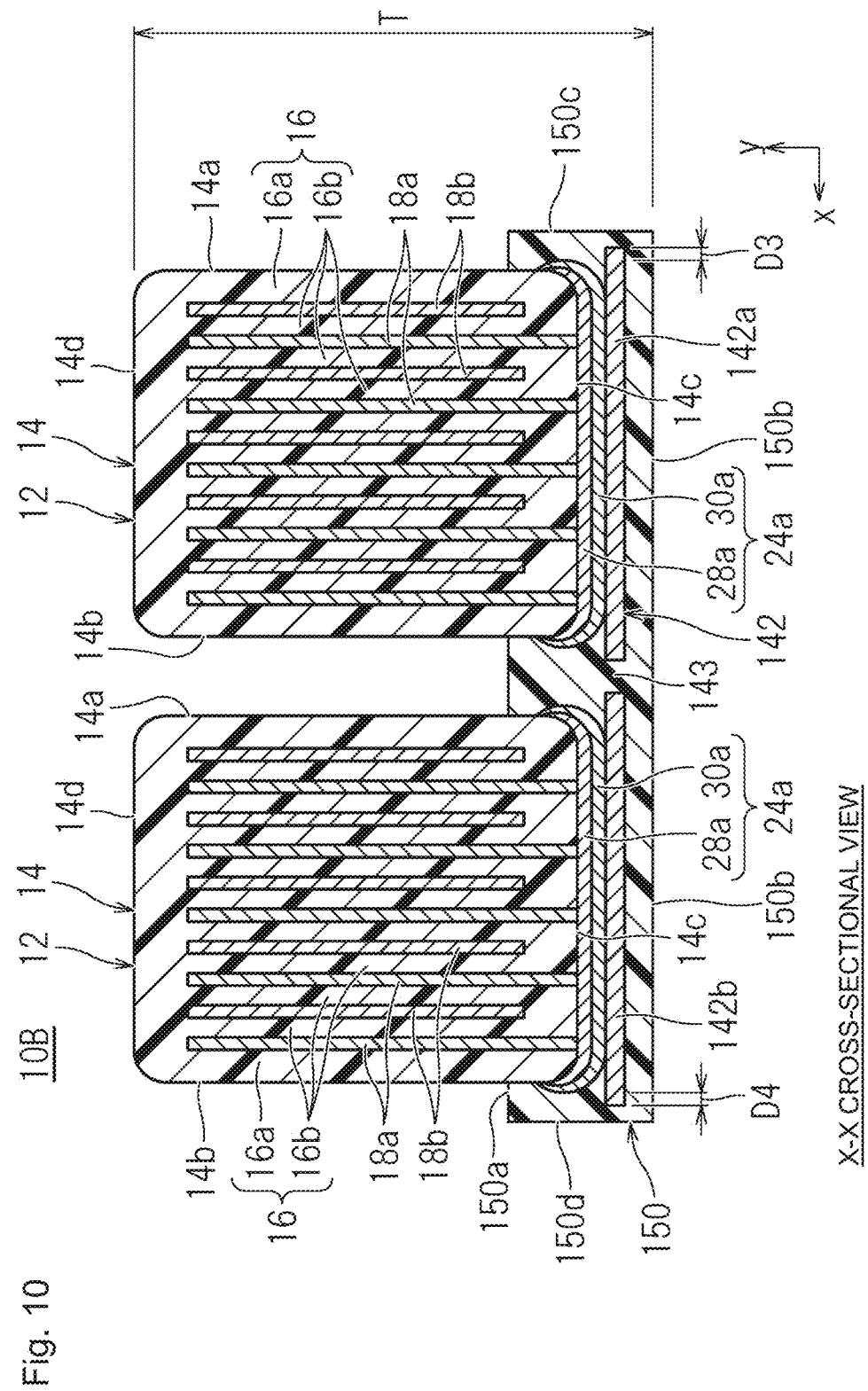
FIG. 10 is a cross-sectional view taken along a line X-X in FIG. 9.

Alternatively, as illustrated in FIG. 9 and FIG. 10, in the gap between the two electronic component main bodies 12, there may be provided a cutout 143 to divide the first bonding portion 142 of the first metal terminal 140A into two segments and a cutout 153 to divide the second bonding portion 152 of the second metal terminal 140B into two segments. FIG. 9 is an external perspective view illustrating a variation on the multilayer ceramic electronic component 10B illustrated in FIG. 7. FIG. 10 is a cross-sectional view taken along a line X-X in FIG. 9.

The first bonding portion 142 includes a bonding portion 142a and a bonding portion 142b, and each of the bonding portions is separately provided for each first outer electrode 24a of the two electronic component main bodies 12. In this case, in the lamination direction x connecting the first principal surface 14a and the second principal surface 14b, it is preferable that the length of the bonding portion 142a and the length of the bonding portion 142b are independently set to correspond to the respective first outer electrodes 24a of the two electronic component main bodies 12.

The second bonding portion 152 includes a bonding portion 152a and a bonding portion 152b, and each of the bonding portions is separately provided for each second outer electrode 24b of the two electronic component main bodies 12. In this case, in the lamination direction x connecting the first principal surface 14a and the second principal surface 14b, it is preferable that the length of the bonding portion 152a and the length of the bonding portion 152b are independently set to correspond to the respective second outer electrodes 24b of the two electronic component main bodies 12.

Further, as illustrated in FIG. 10, it is preferable that, in the lamination direction x connecting the first principal surface 14a and the second principal surface 14b, an end on one side (right end) of the first bonding portion 142 of the first metal terminal 140A projects from a right edge of the first outer electrode 24a positioned on the first side surface 14c of one (right side) of the electronic component main bodies 12 by a dimension D3 equal to or larger than about 0.1 mm and equal to or smaller than about 0.2 mm, for example. Similarly, it is preferable that an end on the other side (left end) of the first bonding portion 142 of the first metal terminal 140A projects from a left edge of the first outer electrode 24a positioned on the first side surface 14c of the other one (left side) of the electronic component main bodies 12 by a dimension D4 equal to or larger than about 0.1 mm and equal to or smaller than about 0.2 mm, for example. Further, it is preferable that a relationship between the second bonding portion 152 of the second metal terminal 140B and the second outer electrode 24b is similar to the above-described relationship. Thus, a bonding area between each of the electronic component main bodies 12 and the metal terminal 140 is able to be maintained constant, and the bonding strength and the resistance value of the metal terminal 140 is able to be controlled to fall within a set range. Note that the gap between the two electronic component main bodies 12 is adjusted in accordance with the amount of projection described above.

The first extension portion 144 of the first metal terminal 140A is connected to one end of the first bonding portion 142 and extends in a direction parallel or substantially parallel to the first side surface 14c of the multilayer body 14 so as to be spaced apart from the electronic component main body 12 toward the left side thereof in the lengthwise direction z connecting the first end surface 14e and the second end surface 14f. The third extension portion 154 of the second metal terminal 140B is connected to one end of the second bonding portion 152 and extends in the direction parallel or substantially parallel to the first side surface 14c of the multilayer body 14 so as to be spaced apart from the electronic component main body 12 toward the right side thereof in the lengthwise direction z connecting the first end surface 14e and the second end surface 14f.

Thus, the distance covered by the exterior material 150 is able to be increased. As a result, it is possible to secure an insulating surface distance (creeping distance) between the first metal terminal 140A and the second metal terminal 140B. It is also possible to secure a bending allowance at the time of bending the first metal terminal 140A and the second metal terminal 140B.

The second extension portion 146 of the first metal terminal 140A is connected to the first extension portion 144 and extends in a direction toward the mounting surface of the mounting substrate so as to provide a gap between the first side surface 14c and the mounting surface. To be specific, the second extension portion 146 bends from a terminal portion of the first extension portion 144 and extends in the direction toward the mounting surface. The fourth extension portion 156 of the second metal terminal 140B is connected to the third extension portion 154 and extends in the direction toward the mounting surface of the mounting substrate so as to provide a gap between the first side surface 14c and the mounting surface. To be specific, the fourth extension portion 156 bends from a terminal portion of the third extension portion 154 and extends in the direction toward the mounting surface.

In the lamination direction x connecting the first principal surface 14a and the second principal surface 14b, although the length of the second extension portion 146 and the length of the fourth extension portion 156 are not particularly limited, it is preferable that the second extension portion 146 and the fourth extension portion 156 have the same or substantially the same lengths as those of the first extension portion 144 and the third extension portion 154, respectively.

However, as illustrated in FIG. 6 as described in the above first preferred embodiment, in the lamination direction x connecting the first principal surface 14a and the second principal surface 14b, the length of the second extension portion 146 and the length of the fourth extension portion 156 may be shorter than the length of the first extension portion 144 and the length of the third extension portion 154, respectively.

The first mounting portion 148 of the first metal terminal 140A is connected to the second extension portion 146 and configured to be mounted on the mounting substrate, and extends parallel or substantially parallel to the mounting surface. The second mounting portion 158 of the second metal terminal 140B is connected to the fourth extension portion 156 and configured to be mounted on the mounting substrate, and extends parallel or substantially parallel to the mounting surface.

The exterior material 150 includes a first principal surface 150a (a portion of which is slightly projected from the two electronic component main bodies 12) and a second principal surface 150b opposing each other in the width direction y connecting the first side surface 14c and second side surface 14d of the two electronic component main bodies 12, a first side surface 150c and a second side surface 150d opposing each other in the lamination direction x connecting the first principal surface 14a and second principal surface 14b of the electronic component main body 12, and a first end surface 150e and a second end surface 150f opposing each other in the lengthwise direction z connecting the first end surface 14e and second end surface 14f of the electronic component main body 12.

In the exterior material 150, the first principal surface 150a is in contact with the first side surfaces 14c of the two electronic component main bodies 12. Accordingly, the exterior material 150 covers a portion of the first side surfaces 14c of the two electronic component main bodies 12, the first outer electrodes 24a and the second outer electrodes 24b, and a portion of the first metal terminal 140A (the entirety or substantially the entirety of the first bonding portion 142 and a portion of the first extension portion 144) and a portion of the second metal terminal 140B (the entirety or substantially the entirety of the second bonding portion 152 and a portion of the third extension portion 154).

The first metal terminal 140A extends from the first end surface 150e of the exterior material 150 in the lengthwise direction z (leftward direction) connecting the first end surface 14e and the second end surface 14f of the electronic component main body 12. The second metal terminal 140B extends from the second end surface 150f of the exterior material 150 in the lengthwise direction z (rightward direction) connecting the first end surface 14e and the second end surface 14f of the electronic component main body 12.

In a preferred embodiment of the present invention, with the above-described configuration, the exterior material 150 covers a portion of the first side surfaces 14c of the two electronic component main bodies 12, the first outer electrodes 24a and the second outer electrodes 24b, and a portion of the first metal terminal 140A and a portion of the second metal terminal 140B, wherein a long creeping distance (insulating surface distance) is able to be secured and the creeping discharge is able to be reduced or prevented.

Next, the multilayer ceramic electronic component 10B according to the second preferred embodiment of the present invention will be described.

Surfaces opposing each other in a direction connecting the first end surface 14e and the second end surface 14f of the electronic component main body 12 (in other words, surfaces opposing each other in a direction in which the metal terminal 140 extends) are referred to as a first end surface and a second end surface of the multilayer ceramic electronic component 10B, respectively. In addition, surfaces opposing each other in a direction connecting the first principal surface 14a and the second principal surface 14b of the electronic component main body 12 are referred to as a first side surface and a second side surface of the multilayer ceramic electronic component 10B, respectively. Further, surface opposing each other in a direction connecting the first side surface 14c and the second side surface 14d of the electronic component main body 12 (in other words, surfaces opposing the mounting surface) are referred to as a first principal surface and a second principal surface of the multilayer ceramic electronic component 10B, respectively.

The dimension in the lengthwise direction z of an entity including the two electronic component main bodies 12, the exterior material 150, the first metal terminal 140A, and the second metal terminal 140B is denoted as an L dimension of the multilayer ceramic electronic component 10B. To rephrase, the lengthwise direction z of the multilayer ceramic electronic component 10B extending in a direction connecting the first end surface 14e and the second end surface 14f of the electronic component main body 12 is defined as an L direction. It is preferable that the L dimension is equal to or larger than about 10 mm and equal to or smaller than about 15 mm, for example.

The dimension in the lamination direction x of the entity including the two electronic component main bodies 12, the exterior material 150, the first metal terminal 140A, and the second metal terminal 140B is denoted as a W dimension of the multilayer ceramic electronic component 10B. To rephrase, the lamination direction x of the multilayer ceramic electronic component 10B extending in a direction connecting the first principal surface 14a and the second principal surface 14b of the electronic component main body is defined as a W direction. It is preferable that the W dimension be equal to or larger than about 4.5 mm and equal to or smaller than about 9.0 mm, for example.

The dimension in the width direction y of the entity including the two electronic component main bodies 12, the exterior material 150, the first metal terminal 140A, and the second metal terminal 140B is denoted as a T dimension of the multilayer ceramic electronic component 10B. To rephrase, the width direction y of the multilayer ceramic electronic component 10B extending in a direction connecting the first side surface 14c and the second side surface 14d of the electronic component main body 12 is defined as a T direction. It is preferable that the T dimension be equal to or larger than about 1.0 mm and equal to or smaller than about 5.5 mm, for example.

With the above configuration, the multilayer ceramic electronic component 10B of the second preferred embodiment is able to obtain higher electrostatic capacitance while achieving the advantageous effect of the multilayer ceramic electronic component 10A of the first preferred embodiment.

Third Preferred Embodiment

Figure 11:
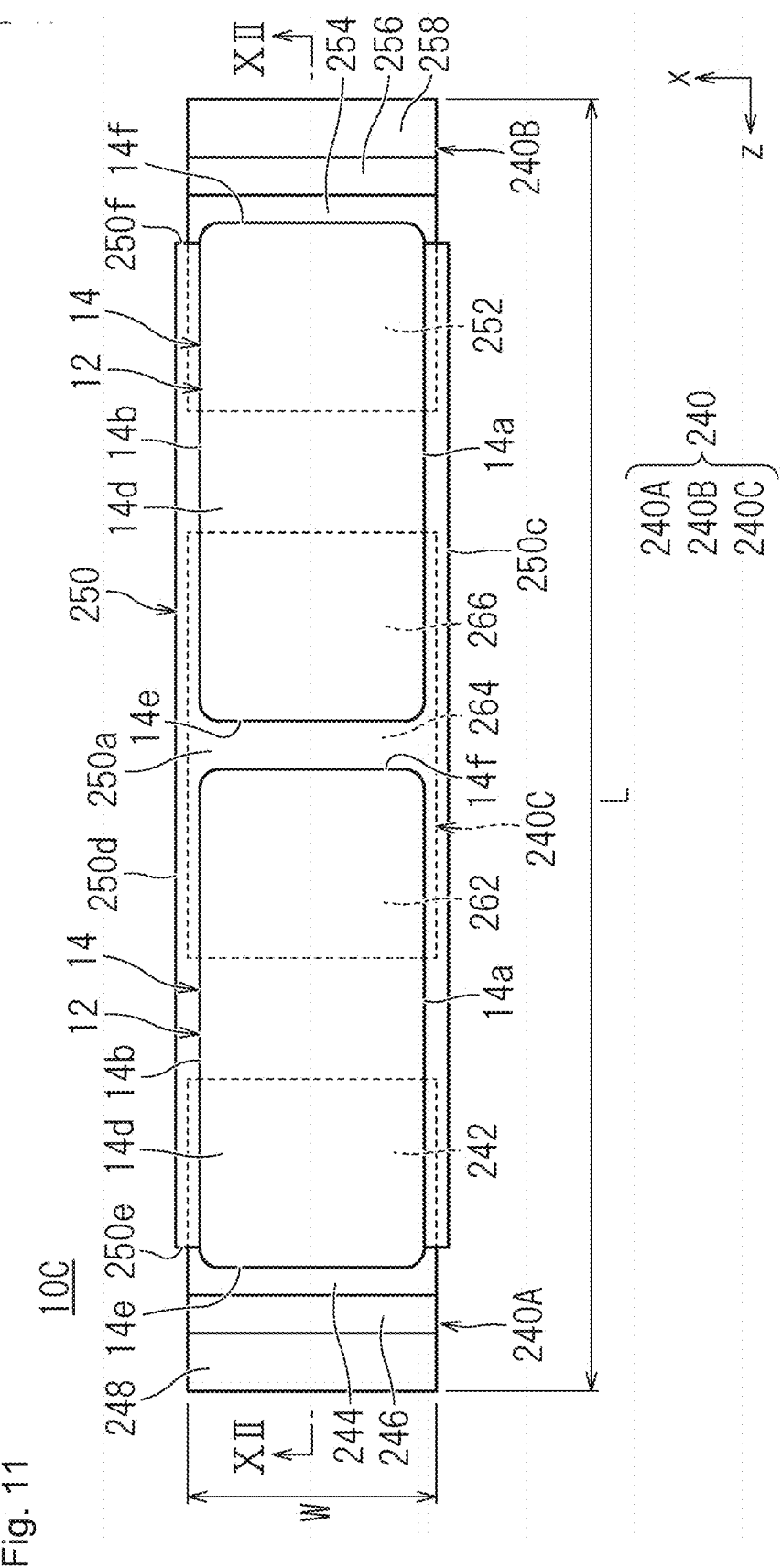
FIG. 11 is a plan view illustrating an example of a multilayer ceramic electronic component according to a third preferred embodiment of the present invention.

A multilayer ceramic electronic component according to a third preferred embodiment of the present invention will be described below. FIG. 11 is a plan view illustrating an example of a multilayer ceramic electronic component according to the third preferred embodiment of the present invention. FIG. 12 is a cross-sectional view taken along a line XII-XII in FIG. 11.

In a multilayer ceramic electronic component 10C according to the third preferred embodiment, two of the electronic component main bodies 12 described in the first preferred embodiment are disposed in a tandem so as to be spaced apart from each other. Accordingly, the same or corresponding elements as those of the electronic component main body 12 will be denoted by the same reference numerals, and description thereof will be omitted.

The two electronic component main bodies 12 are disposed such that the two first end surfaces 14e, the two second end surfaces 14f, or the first end surface 14e and the second end surface 14f oppose each other with a gap therebetween.

Although the third preferred embodiment includes two of the electronic component main bodies 12, two or more of the electronic component main bodies 12 may be provided.

As illustrated in FIGS. 11 and 12, the multilayer ceramic electronic component 10C includes two electronic component main bodies 12, a first metal terminal 240A, a second metal terminal 240B and a third metal terminal 240C (hereinafter, also referred to as "metal terminal 240"), and an exterior material 250.

The first metal terminal 240A and the second metal terminal 240B in the multilayer ceramic electronic component 10C are connected to the two electronic component main bodies 12 disposed in tandem, and are provided to surface-mount the multilayer ceramic electronic component 10C on the mounting substrate. Specifically, the first metal terminal 240A is connected to the first outer electrode 24a of one (left side) of the electronic component main bodies 12. The second metal terminal 240B is connected to the second outer electrode 24b of the other one (right side) of the electronic component main bodies 12. The third metal terminal 240C extends to and is connected to the second outer electrode 24b of the one (left side) of the electronic component main bodies 12 and the first outer electrode 24a of the other one (right side) of the electronic component main bodies 12.

The first metal terminal 240A includes a first bonding portion 242 connected to the first outer electrode 24a of one (left side) of the electronic component main bodies 12 and opposing the first side surface 14c or the second side surface 14d, a first extension portion 244 connected to the first bonding portion 242 and extending in a direction parallel or substantially parallel to the first side surface 14c of the multilayer body 14 (side surface on the mounting surface side) so as to be spaced apart from the one (left side) of the electronic component main bodies 12 to the left side thereof in the lengthwise direction z connecting the first end surface 14e and the second end surface 14f, a second extension portion 246 connected to the first extension portion 244 and extending toward a side of the mounting surface of the mounting substrate located on the opposite side to the electronic component main body 12 in order to provide a gap between the first side surface 14c and the mounting surface, and a first mounting portion 248 connected to the second extension portion 246 and configured to be mounted on the mounting substrate.

The second metal terminal 240B includes a second bonding portion 252 connected to the second outer electrode 24b of the other one (right side) of the electronic component main bodies 12 and opposing the first side surface 14c or the second side surface 14d, a third extension portion 254 connected to the second bonding portion 252 and extending in the direction parallel or substantially parallel to the first side surface 14c of the multilayer body 14 (side surface on the mounting surface side) so as to be spaced apart from the other one (right side) of the electronic component main bodies 12 to the right side thereof in the lengthwise direction z connecting the first end surface 14e and the second end surface 14f, a fourth extension portion 256 connected to the third extension portion 254 and extending toward the side of the mounting surface of the mounting substrate located on the opposite side to the electronic component main body 12 in order to provide a gap between the first side surface 14c and the mounting surface, and a second mounting portion 258 connected to the fourth extension portion 256 and configured to be mounted on the mounting substrate.

The third metal terminal 240C includes a third bonding portion 262 connected to the second outer electrode 24b of the one (left side) of the electronic component main bodies 12 and opposing the first side surface 14c or the second side surface 14d, a fifth extension portion 264 connected to the third bonding portion 262 and extending to both of the two electronic component main bodies 12 in the direction parallel or substantially parallel to the first side surface 14c or the second side surface 14d, and a fourth bonding portion 266, opposing the first side surface 14c or the second side surface 14d, that is connected to the fifth extension portion 264 and is also connected to the first outer electrode 24a of the other one (right side) of the electronic component main bodies 12.

The first bonding portion 242 of the first metal terminal 240A is connected to the first outer electrode 24a provided at the left side of the first side surface 14c of the one (left side) of the electronic component main bodies 12 and extends in the lengthwise direction z connecting the first end surface 14e and the second end surface 14f. The second bonding portion 252 of the second metal terminal 240B is connected to the second outer electrode 24b provided at the right side of the first side surface 14c of the other one (right side) of the electronic component main bodies 12 and extends in the lengthwise direction z connecting the first end surface 14e and the second end surface 14f.

The third bonding portion 262 of the third metal terminal 240C is connected to the second outer electrode 24b provided at the right side of the first side surface 14c of the one (left side) of the electronic component main bodies 12 and extends in the lengthwise direction z connecting the first end surface 14e and the second end surface 14f. The fourth bonding portion 266 of the third metal terminal 240C is connected to the first outer electrode 24a provided at the left side of the first side surface 14c of the other one (right side) of the electronic component main bodies 12 and extends in the lengthwise direction z connecting the first end surface 14e and the second end surface 14f.

The first extension portion 244 of the first metal terminal 240A is connected to one end of the first bonding portion 242 and extends in a direction parallel or substantially parallel to the first side surface 14c of the multilayer body 14 so as to be spaced apart from the one (left side) of the electronic component main bodies 12 toward the left side thereof in the lengthwise direction z connecting the first end surface 14e and the second end surface 14f. The third extension portion 254 of the second metal terminal 240B is connected to one end of the second bonding portion 252 and extends in the direction parallel or substantially parallel to the first side surface 14c of the multilayer body 14 so as to be spaced apart from the other one (right side) of the electronic component main bodies 12 toward the right side thereof in the lengthwise direction z connecting the first end surface 14e and the second end surface 14f.

The fifth extension portion 264 of the third metal terminal 240C includes one (left) end portion thereof connected to the third bonding portion 262 and the other (right) end portion thereof connected to the fourth bonding portion 266, and extends in the direction parallel or substantially parallel to the first side surface 14c of the multilayer body 14 and also in the lengthwise direction z connecting the first end surface 14e and the second end surface 14f.

The second extension portion 246 of the first metal terminal 240A is connected to the first extension portion 244 and extends in the direction toward the mounting surface of the mounting substrate so as to provide a gap between the first side surface 14c and the mounting surface. To be specific, the second extension portion 246 bends from a terminal portion of the first extension portion 244 and extends in the direction toward the mounting surface. The fourth extension portion 256 of the second metal terminal 240B is connected to the second extension portion 254 and extends in the direction toward the mounting surface of the mounting substrate so as to provide a gap between the first side surface 14c and the mounting surface. To be specific, the fourth extension portion 256 bends from a terminal portion of the second extension portion 254 and extends in the direction toward the mounting surface.

The first mounting portion 248 of the first metal terminal 240A is connected to the second extension portion 246 and configured to be mounted on the mounting substrate, and extends parallel or substantially parallel to the mounting surface. The second mounting portion 258 of the second metal terminal 240B is connected to the fourth extension portion 256 and configured to be mounted on the mounting substrate, and extends parallel or substantially parallel to the mounting surface.

The exterior material 250 includes a first principal surface 250a (a portion of which slightly projects from the two electronic component main bodies 12) and a second principal surface 250b opposing each other in the width direction y connecting the first side surface 14c and second side surface 14d of the two electronic component main bodies 12, a first side surface 250c and a second side surface 250d opposing each other in the lamination direction x connecting the first principal surface 14a and second principal surface 14b of the electronic component main body 12, and a first end surface 250e and a second end surface 250f opposing each other in the lengthwise direction z connecting the first end surface 14e and second end surface 14f of the electronic component main body 12.

In the exterior material 250, the first principal surface 250a is in contact with the first side surfaces 14c of the two electronic component main bodies 12. Accordingly, the exterior material 250 covers a portion of the first side surfaces 14c of the two electronic component main bodies 12, the first outer electrodes 24a and the second outer electrodes 24b, a portion of the first metal terminal 240A (the entirety or substantially the entirety of the first bonding portion 242 and a portion of the first extension portion 244) and a portion of the second metal terminal 240B (the entirety or substantially the entirety of the second bonding portion 252 and a portion of the third extension portion 254), and the entirety or substantially the entirety of the third metal terminal 240C.

The first metal terminal 240A extends from the first end surface 250e of the exterior material 250 in the lengthwise direction z (leftward direction) connecting the first end surface 14e and the second end surface 14f of the electronic component main body 12. The second metal terminal 240B extends from the second end surface 250f of the exterior material 250 in the lengthwise direction z (rightward direction) connecting the first end surface 14e and the second end surface 14f of the electronic component main body 12.

With the above configuration, the multilayer ceramic electronic component 10C of the third preferred embodiment is able to improve the withstand voltage by connecting two electronic component main bodies 12 in series. As illustrated in FIG. 12, since the creeping distance (insulating surface distance) is further increased, the multilayer ceramic electronic component 10C is also able to be used in a higher voltage application.

Although the electrostatic capacitance is decreased by connecting the two electronic component bodies 12 in series, by the outer electrode 24 of the electronic component main body 12 being provided only on the first side surface 14c, the density of electrostatic capacitance is increased so that the decrease in the electrostatic capacitance is reduced or prevented. In other words, it is possible to relatively increase the density of electrostatic capacitance as compared with the usual series connection.

2. Manufacturing Method for Multilayer Ceramic Electronic Component

Next, a preferred embodiment of a manufacturing method for a multilayer ceramic electronic component having the above-described configuration will be described with reference to the multilayer ceramic electronic component 10A as an example.

First, a manufacturing method for the electronic component main body 12 will be described. A ceramic green sheet, a conductive paste for an inner electrode used for the inner electrode layer 18, and a conductive paste for an outer electrode used for the outer electrode 24 are prepared. An organic binder and a solvent are contained in the ceramic green sheet, the conductive paste for the inner electrode and the conductive paste for the outer electrode, and it is to be noted that a known organic binder, a known organic solvent, and other known substances may be used.

Then, for example, the conductive paste for the inner electrode is applied on the ceramic green sheet in a predetermined pattern, thus forming an inner electrode pattern. The conductive paste for the inner electrode may be applied by a known method such as screen printing or gravure printing, for example.

Next, a predetermined number of ceramic green sheets for an outer layer having no inner electrode pattern printed thereon are laminated, ceramic green sheets having the inner electrode pattern printed thereon are sequentially laminated on the laminated ceramic green sheets for the outer later, and then a predetermined number of ceramic green sheets for the outer layer are laminated thereon, thus producing multilayer body sheets. Subsequently, the multilayer body sheets are pressure-bonded in the laminating direction x with a method such as isostatic press, for example, thus producing a multilayer body block.

Thereafter, the multilayer body block is cut into a predetermined shape and size, so that a raw multilayer body chip is cut out. At this time, corner portions, ridge portions, and other portions of the raw multilayer body may be rounded by barrel polishing or other suitable method. Subsequently, the raw multilayer body chip having been cut out is fired to produce the multilayer body 14. Although the firing temperature depends on the material of the ceramic, the material of the conductive paste for the inner electrode, and other factors, it is preferable that the firing temperature is equal to or higher than about 900° C. and equal or lower than about 1300° C., for example.

Next, in order to form a baked layer of the outer electrode 24, the conductive paste for the outer electrode is applied to the first extended section 20a of the first inner electrode 18a exposed at the left side of the first side surface 14c of the multilayer body 14, and is baked. Similarly, the conductive paste for the outer electrode is applied to the second extended section 20b of the second inner electrode 18a exposed at the right side of the first side surface 14c of the multilayer body 14, and is baked. At this time, it is preferable that the baking temperature is equal to or higher than about 700° C. and equal to or lower than about 900° C., for example. Here, in a case in which a resin layer is provided, a conductive resin paste containing a metal ingredient for a resin layer and a thermosetting resin is applied and cured. In a case in which an underlying electrode layer is formed by a thin film layer, a plating layer, or other suitable layer, the underlying electrode layer is formed by a vapor deposition method, a plating method, or other suitable method, for example.

Thereafter, one or more plating layers are formed on a surface of the baked layer to form the outer electrode 24, and the electronic component main body 12 is manufactured.

Next, a method for attaching the first metal terminal 40A and the second metal terminal 40B will be described. First, the first metal terminal 40A and the second metal terminal 40B which have been cut into predetermined shapes are prepared.

Next, the first metal terminal 40A is attached, with a bonding material, to the first outer electrode 24a formed on the first side surface 14c of the electronic component main body 12, and the second metal terminal 40B is attached to the second outer electrode 24b with the bonding material. In this case, solder, for example, is used as the bonding material. The soldering temperature is preferably, for example, equal to or higher than about 270° C. and equal to or lower than about 290° C. in the reflow for about 30 seconds or more.

Next, the exterior material 15 is formed. The exterior material 15 is formed by, for example, a transfer molding method. After a resin of the exterior material 15 is filled in a mold, the electronic component main body 12 is disposed thereon, and then the resin is cured. Thus, the exterior material 15 is provided on predetermined portions (a portion of the first side surface 14c of the electronic component main body 12, the first outer electrode 24a and the second outer electrode 24b, and a portion of the first metal terminal 40A and a portion of the second metal terminal 40B).

Unnecessary portions of the first metal terminal 40A and the second metal terminal 40B are cut. Cutting of the unnecessary portions of the first metal terminal 40A and the second metal terminal 40B is performed using a punching die, for example.

Next, the first metal terminal 40A and the second metal terminal 40B are bent into desired shapes. For example, a bending die is used to bend the first metal terminal 40A and the second metal terminal 40B into desired shapes.

As described above, the multilayer ceramic electronic component 10A illustrated in FIG. 1 is manufactured.

It should be noted that the present invention is not limited to the above-described preferred embodiments, and various variations may be made within the scope and spirit of the present invention. Further, the thickness of the ceramic layer, the number of layers, the area of the opposing electrode, and the outside dimension of the electronic component main body are not limited thereto.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
an electronic component main body including:
   a multilayer body including a plurality of dielectric layers that are laminated and a plurality of inner electrode layers that are laminated, and including a first principal surface and a second principal surface opposing each other in a lamination direction, a first side surface and a second side surface opposing each other in a width direction orthogonal or substantially orthogonal to the lamination direction, and a first end surface and a second end surface opposing each other in a lengthwise direction orthogonal or substantially orthogonal to both of the lamination direction and the width direction; and
   a first outer electrode disposed at least on the first side surface and a second outer electrode spaced apart from the first outer electrode and disposed at least on the first side surface; and
a first metal terminal connected to the first outer electrode and a second metal terminal connected to the second outer electrode; wherein
the plurality of inner electrode layers include a first inner electrode layer and a second inner electrode layer;
the first inner electrode layer includes a first opposing section opposing the second inner electrode layer, and a first extended section extending to at least a portion of the first side surface;
the second inner electrode layer includes a second opposing section opposing the first inner electrode layer, and a second extended section that does not overlap with the first extended section of the first inner electrode layer and that extends to at least a portion of the first side surface;
the electronic component main body is disposed such that the first side surface opposes a mounting surface of a mounting substrate on which the multilayer ceramic electronic component is to be mounted, and the first inner electrode layer and the second inner electrode layer are perpendicular or substantially perpendicular to the mounting surface;
a portion of the first side surface, the first outer electrode and the second outer electrode, and a portion of the first metal terminal and a portion of the second metal terminal are covered with an exterior material;
the first metal terminal includes:
   a first bonding portion connected to the first outer electrode and opposing the first side surface;
   a first extension portion connected to the first bonding portion and extending so as to be spaced apart from the multilayer ceramic electronic component main body, the first extension portion extending in the lengthwise direction parallel or substantially parallel to the first side surface and protruding outside of the exterior material;
   a second extension portion connected to the first extension portion and extending toward a side of the mounting surface to provide a gap between the mounting surface and the exterior material; and
   a first mounting portion connected to the second extension portion and extending so as to be spaced apart from the multilayer ceramic electronic component main body, in a direction parallel or substantially parallel to the first side surface and in the lengthwise direction connecting the first end surface and the second end surface, and configured to be mounted on the mounting substrate;
the second metal terminal includes:
   a second bonding portion connected to the second outer electrode and opposing the first side surface;
   a third extension portion connected to the second bonding portion and extending so as to be spaced apart from the multilayer ceramic electronic component main body, the third extension portion extending in the lengthwise direction parallel or substantially parallel to the first side surface and protruding outside of the exterior material;
   a fourth extension portion connected to the third extension portion and extending toward the side of the mounting surface to provide a gap between the mounting surface and the exterior material; and
   a second mounting portion connected to the fourth extension portion, extending parallel or substantially parallel to the mounting surface, and configured to be mounted on the mounting substrate;
the first and second metal terminals are configured to mount the electronic component main body on the mounting surface such that a portion of the exterior material covering the first side surface between the first outer electrode and the second outer electrode is directly adjacent to the mounting surface;
the portion of the exterior material covering the first side surface is in contact with the first side surface; and
in a cross-sectional view of the multilayer ceramic electronic component taken along a line extending in the lengthwise direction, only the first side surface of the multilayer body is covered with the exterior material.

2. The multilayer ceramic electronic component according to claim 1, wherein two or more of the electronic component main bodies are provided and spaced apart from each other, and are arranged such that the first principal surfaces, the second principal surfaces, or the first principal surface and the second principal surface of the two or more of the electronic component main bodies oppose each other.

3. The multilayer ceramic electronic component according to claim 1, wherein the first metal terminal and the second metal terminal each include a terminal main body and a plating film provided on a surface of the terminal main body, and a base material of the terminal main body is made of oxygen-free copper or a Cu-based alloy having high thermal conductivity.

4. The multilayer ceramic electronic component according to claim 1, wherein the exterior material is made of a silicone-based resin or an epoxy-based resin.

5. The multilayer ceramic electronic component according to claim 1, wherein the plurality of dielectric layers are made of a dielectric ceramic containing at least one of $BaTiO_3$, $CaTiO_3$, $SrTiO_3$, or $CaZrO_3$ as a main ingredient.

6. The multilayer ceramic electronic component according to claim 5, wherein the dielectric ceramic further includes at least one of a Mn compound, an Fe compound, a Cr compound, a Co compound, or a Ni compound in a smaller content than the main ingredient.

7. The multilayer ceramic electronic component according to claim 1, wherein a thickness of each of the plurality of dielectric layers is equal to or larger than about 0.5 μm and equal to or smaller than about 40 μm.

8. The multilayer ceramic electronic component according to claim 1, wherein a thickness of each of the plurality of inner electrode layers is equal to or larger than about 0.1 μm and equal to or smaller than about 2 μm.

9. The multilayer ceramic electronic component according to claim 1, wherein
    each of the first and second outer electrodes includes in order from the multilayer body an underlying electrode layer and a plating layer; and
    the underlying electrode layer contains glass and metal.

10. The multilayer ceramic electronic component according to claim 9, wherein the first metal terminal and the second metal terminal each include a terminal main body and a plating film provided on a surface of the terminal main body, and a base material of the terminal main body is made of oxygen-free copper or a Cu-based alloy having high thermal conductivity.

* * * * *